United States Patent [19]

Frolow

[11] E Re. 31,419

Best Available Copy

[45] Reissued Oct. 18, 1983

[54] TENNIS RACKET

[76] Inventor: Jack L. Frolow, 448 Dewey St., Long Branch, N.J. 07740

[21] Appl. No.: 229,776

[22] Filed: Jan. 28, 1981

Related U.S. Patent Documents

Reissue of:

[64] Patent No.: 4,165,071
Issued: Aug. 21, 1979
Appl. No.: 646,848
Filed: Jan. 5, 1976

[51] Int. Cl.[3] ..... A63B 49/02

[52] U.S. Cl. ..... 273/73 C; 273/73 F; 273/73 G; 273/73 H

[58] Field of Search ..... 273/73 R, 73 C, 73 D, 273/73 F, 73 G, 73 H, 73 J, 75, 165, DIG. 7, DIG. 23

[56] References Cited

U.S. PATENT DOCUMENTS

| | | | |
|---|---|---|---|
| 1,497,148 | 6/1924 | Kenyon et al. | 273/73 H |
| 1,539,019 | 5/1925 | Nikonow | 273/73 C X |
| 1,556,558 | 10/1925 | Gower et al. | 273/73 H |
| 1,942,479 | 1/1934 | Kleinman | 273/73 C X |
| 2,164,631 | 7/1939 | Abell | 273/73 H |
| 2,224,567 | 12/1940 | Reach | 273/73 C |
| 3,086,777 | 4/1963 | Lacoste | 273/73 H |
| 3,147,012 | 9/1964 | Sullivan | 273/165 |
| 3,515,386 | 6/1970 | Mason | 273/73 R |
| 3,645,008 | 2/1972 | Delsack | 273/75 X |
| 3,647,211 | 3/1972 | Doessel et al. | 273/73 C |
| 3,724,850 | 4/1973 | Stevens | 273/73 G X |
| 3,751,034 | 8/1973 | Ortz et al. | 273/73 F X |
| 3,752,478 | 8/1973 | Flak | 273/73 H |
| 3,755,037 | 8/1973 | Erwin et al. | 273/DIG. 7 |
| 3,801,099 | 4/1974 | Lair | 273/73 C |
| 3,809,402 | 5/1974 | Haines | 273/73 C |
| 3,834,699 | 9/1974 | Pass | 273/73 C X |
| 3,926,431 | 12/1975 | De Lorean | 273/73 D |
| 3,941,380 | 3/1976 | Lacoste | 273/73 G X |
| 3,975,017 | 8/1976 | Galich | 273/73 C X |
| 3,986,716 | 10/1976 | Taussig | 273/73 C |

FOREIGN PATENT DOCUMENTS

| | | | |
|---|---|---|---|
| 605166 | 11/1934 | Fed. Rep. of Germany | 273/73 G |
| 2417439 | 10/1975 | Fed. Rep. of Germany | 273/73 H |
| 800262 | 4/1936 | France | 273/73 H |
| 1495578 | 8/1967 | France | 273/73 C |
| 8112 | of 1884 | United Kingdom | 273/73 H |
| 14147 | of 1885 | United Kingdom | 273/73 D |
| 15670 | of 1886 | United Kingdom | 273/73 G |
| 107660 | 7/1917 | United Kingdom | 273/73 H |
| 201245 | 7/1923 | United Kingdom | 273/73 H |
| 267837 | 3/1927 | United Kingdom | 273/73 D |
| 284754 | 2/1928 | United Kingdom | 273/73 H |
| 327796 | 4/1930 | United Kingdom | 273/73 D |
| 420966 | 12/1934 | United Kingdom | 273/73 G |
| 482164 | 3/1938 | United Kingdom | 273/73 H |
| 547946 | 9/1942 | United Kingdom | 273/73 D |
| 1223834 | 3/1971 | United Kingdom | 273/73 G |
| 1278474 | 6/1972 | United Kingdom | 273/73 G |

OTHER PUBLICATIONS

"The Sporting Goods Dealer"; May 1974; pp. 126, 128.
"The Sporting Goods Dealer"; May 1975; p. 156.

*Primary Examiner*—Anton O. Oechsle

[57] ABSTRACT

A tennis racket is provided having the same swing weight as rackets of the prior art, but having a significant reduction in the weight, and a significant increase in the distance of the center of percussion and in the distance of the center of gravity from the end of the handle. A significant reduction in the deflection and vibration of the racket caused by the impact of the ball is provided. The tendency of the racket to turn in the players hand when a ball hits the racket off of the longitudinal axis of the racket, is reduced.

These improvements are accomplished by controlling the distribution of material and the cross-sectional shape along the length, width, and depth of the racket, and by the utilization of materials having a high stiffness and strength per unit weight.

Methods are provided to measure the swing weight of the racket about selected axes and to measure the flexibility and vibratory characteristics of the racket.

116 Claims, 40 Drawing Figures

FIG. 40

| RACKET | L | CF | CP | DIF/CP | CG | W | CG/CP | WCG | $I_S$ | $I_a$ | $I_a/I_S$ | ENDS FREE ⊥ TO FACE $F_1$ | $D_1$ | NOD | ENDS FREE ∥ TO FACE $F_2$ | $D_2$ | CANTILEVER ⊥ TO FACE $F_3$ | $D_3$ | CANTILEVER ∥ TO FACE $F_4$ | $D_4$ | TOR. $F_5$ |
|---|---|---|---|---|---|---|---|---|---|---|---|---|---|---|---|---|---|---|---|---|---|
| Y | 26.1 | 21.0 | 17.9 | .177 | 12.8 | 13.5 | .714 | 172 | 3072 | 58.0 | .019 | 120 | .009 | 5.75 | 161 | 6.5 | 31 | .038 | 35 | .032 | 90 |
| H | 26.6 | 20.8 | 17.9 | .165 | 12.8 | 12.6 | .714 | 161 | 2874 | 55.5 | .019 | 118 | .013 | 6.00 | 132 | 7.5 | 30 | .040 | 26 | .060 | 50 |
| D | 27.1 | 21.4 | 18.3 | .172 | 13.1 | 13.0 | .719 | 171 | 3121 | 50.8 | .016 | 110 | .014 | 6.00 | 125 | 8.0 | 30 | .040 | 30 | .040 | 100 |
| TA | 27.0 | 21.2 | 18.1 | .170 | 13.3 | 13.6 | .731 | 180 | 3263 | 56.3 | .017 | 105 | .010 | 6.00 | 170 | 5.0 | 32 | .041 | 39 | .020 | 61 |
| TE | 27.3 | 21.5 | 18.5 | .162 | 13.5 | 12.9 | .729 | 166 | 3063 | 60.0 | .020 | 125 | .012 | 6.00 | 105 | 10. | 31 | .045 | 20 | .080 | 50 |
| W | 26.6 | 21.1 | 18.2 | .158 | 13.1 | 12.6 | .720 | 167 | 3047 | 58.5 | .019 | 92 | .023 | 6.00 | 118 | 10. | 23 | .071 | 30 | .040 | 52 |
| | | | | | | | | | | | | | | | | | | | | | |
| | | | | | | | | | | | | | | | | | | | | | |
| 1 | 27.3 | 22.0 | 20.9 | .053 | 17.4 | 9.64 | .833 | 168 | 3506 | 71.2 | .020 | 125 | .007 | 10.0 | 165 | 3.5 | 39 | .031 | 39 | .031 | 89 |
| 2 | 27.2 | 22.0 | 19.7 | .111 | 16.9 | 9.65 | .858 | 163 | 3216 | 70.5 | .022 | 140 | .011 | 8.75 | 180 | 5.0 | 31 | .040 | 26 | .062 | 75 |
| 3 | 26.5 | 21.1 | 18.9 | .116 | 15.9 | 10.4 | .841 | 165 | 3125 | 60.0 | .019 | 170 | .007 | 8.50 | 200 | 4.0 | 36 | .037 | 36 | .034 | 49 |
| 4 | 26.6 | 21.3 | 19.8 | .079 | 16.9 | 10.3 | .854 | 173 | 3436 | 70.5 | .021 | 170 | .007 | 9.25 | 205 | 2.5 | 36 | .030 | 48 | .024 | 68 |
| 5 | 27.3 | 21.9 | 19.7 | .111 | 17.0 | 9.71 | .867 | 165 | 3235 | 55.1 | .017 | 150 | .007 | 9.50 | 155 | 5.5 | 34 | .036 | 34 | .037 | 63 |
| 6 | 27.5 | 21.4 | 19.9 | .075 | 16.6 | 8.59 | .837 | 143 | 2840 | 55.5 | .020 | 100 | .020 | 8.50 | 219 | 5.0 | 25 | .051 | 36 | .028 | 70 |
| 7 | 26.8 | 21.5 | 19.6 | .096 | 16.6 | 10.0 | .845 | 167 | 3265 | 61.3 | .019 | 155 | .007 | 9.00 | 180 | 3.0 | 40 | .032 | 46 | .028 | 92 |
| | IN. | IN. | IN. | | IN. | OZ. | | OZ-IN | OZ-IN$^2$ | OZ-IN$^2$ | | ≈/SEC | IN. | IN. | ≈/SEC | $10^{-3}$ IN. | ≈/SEC | IN. | ≈/SEC | IN. | ≈/SEC |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 |

TENNIS RACKET

Matter enclosed in heavy brackets [ ] appears in the original patent but forms no part of this reissue specification; matter printed in italics indicates the additions made by reissue.

BACKGROUND

Tennis rackets in the prior art weigh from 12 ounces for a light racket to over 14 ounces for a heavy racket. The center of percussion or sweet spot ranges from 17 inches to 18.50 inches, from the end of the racket handle. This center does not coincide with the center of the strings, but is closer to the handle end. Thus, when a ball is struck at the center of the racket face, a shock is felt at the handle grip. Because the prior art rackets are more flexible than is desired, vibrations are set up in the frame which robs energy from the rebound of the ball and causes vibrations to be transmitted to the arm of the player, as well as cause inaccuracy in the rebound of the ball. The weight of the prior art rackets contributes heavily to the development of tennis elbow, as well as the fatigue of the player's arm and body.

Further, rackets of the past have utilized wood, aluminum, steel,fiberglass, boron and graphite composites.

The prior art, while utilizing these materials, have not utilized the structural configurations to take advantage of the stiffness to unit weight ratio, as well as the strength to unit weight ratio of these materials to obtain a reduction in weight, increase the center of percussion, reduce the deflection, reduce the vibration, and yet maintain the same swing weight.

It is noted that in U.S. Pat. No. 1,539,019, by Nikonow, an attempt was made to reduce the weight of the racket, increase the distance of the center of percussion from the handle end, by increasing the distance of center of gravity or balance point further from the handle end. He states he attained a weight of 12 ounces, a center of balance of between 15 to 17 inches. The overall length of the racket was 26 inches and the striking power was equivalent to a 14½ ounce racket. This racket was made of wood and the crossectional areas shown were not the best to achieve the results desired.

Another difficulty with the prior art is that when balls are hit which are to the left or right of a line running from the tip of the racket to the handle down the center, henceforth called the longitudinal axis of the racket, the racket tends to turn in hand of the player causing a poorly hit ball with little power or accuracy.

Another difficulty with the prior art rackets is that they are rated as light, medium and heavy, but very little is said about the swing weight of a racket. This swing weight is the important parameter in determining the striking power of a racket. For example, in a set of golf clubs, the swing weight of all the clubs are substantially the same, and sets may be obtained in combination of categories A,B,C,D and 1,2,3,4, providing for 16 graduations of swing weight for a user to choose from. This swing weight is the moment of inertia about a point 2.25 inches above the end of the club handle (see U.S. Pat. No. 3,473,370 by E. J. Marciniak.).

Further, the prior art does not provide for easily available means for measuring the moment of inertia of a racket.

Further, the prior art does not provide for an analysis to determine the proper moment of inertia to be used, considering the weight of a tennis ball, the velocity of the on-coming ball with respect to the player.

Another difficulty with the prior art rackets is that the force necessary to deflect the strings a given amount perpendicular to the face of the racket varies considerably from the center [of] *to* the edges, in part because of the smaller length of the strings at the edges from those used at the center. This variation contributes further to inaccurate hits.

SUMMARY

It is an object of this invention to provide a tennis racket having the same swing weight as rackets of the prior art, but having a significant reduction in weight, and a significant increase in the distance of the center of percussion and in the distance of the center of gravity from the end of the handle.

It is an object of this invention to provide a tennis racket having a significant reduction in the deflection and vibration of a racket frame caused by the impact of the ball.

It is another object of this invention to provide a tennis racket having a reduction in the tendency of the racket to turn in the players hand when a ball hits the racket off of the longitudinal axis.

It is an object of this invention to provide a method to rate rackets by their swing weight, vibratory characteristics, and other physically measurable parameters.

It is an object of this invention to provide an easy method for measuring the swing weight and other physically measurable parameters of a racket such as the frequency of vibration after impact, nodal points associated with the vibration, and the center of percussion.

It is an object of this invention to accomplish these improvements by controlling the distribution of material and the crossectional shape along the length width and depth of the racket, and by the utilization of material having a high stiffness and strength per unit of weight.

It is an object of this invention to determine the proper swing weight of a racket considering the velocity of the of the oncoming ball with respect to the racket, and provide a means to change the swing weight of the racket.

It is an object of this invention to minimize the variation of the force necessary to deflect the strings a given amount perpendicular to the face of the racket over the face of the racket.

Figure 31:
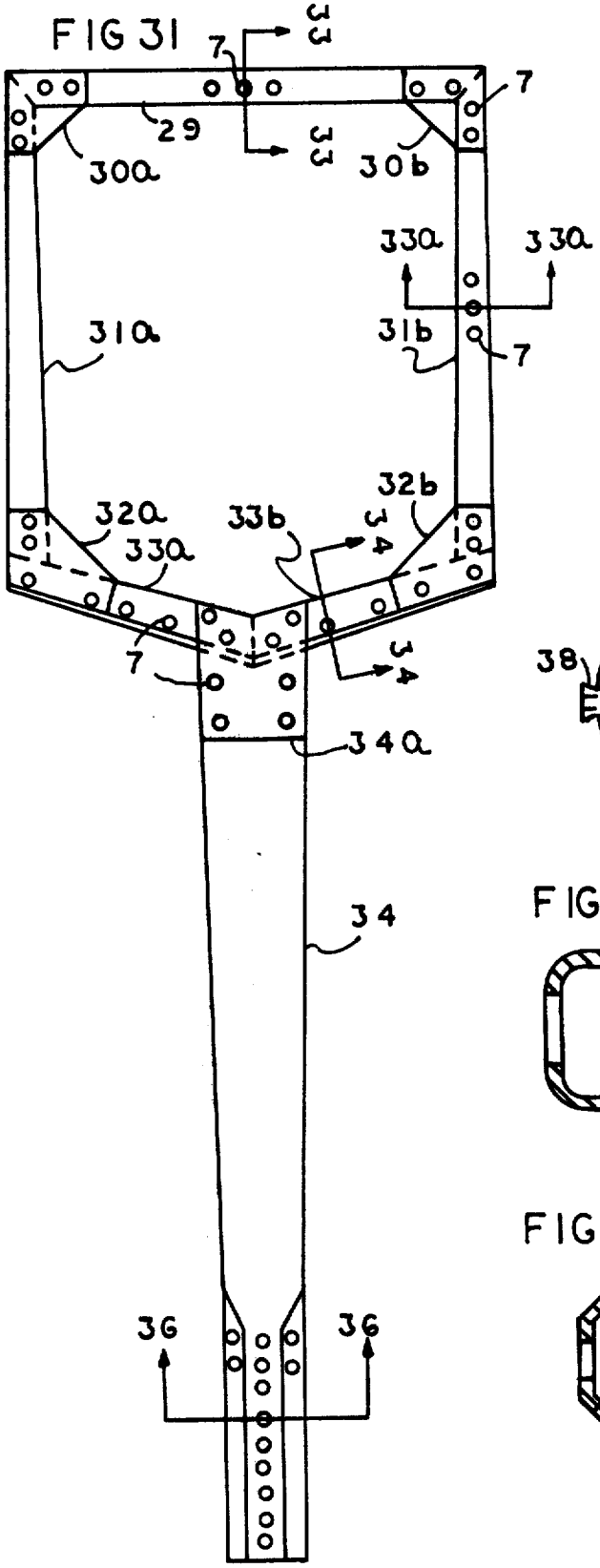
FIG. 31 is a front view of a racket which is another embodiment of the invention.
Figure 32:
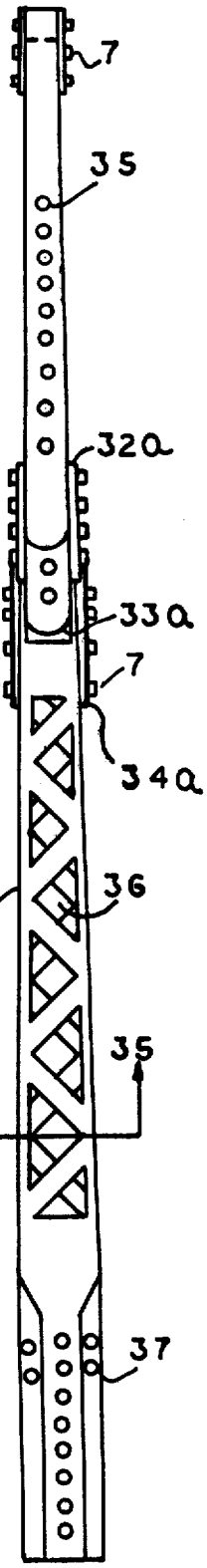
FIG. 32 is a side view of the racket shown in FIG. 31.

FIGS. 33, 34, 35, and 36 are crossectional views of the sections 33—33, 33a—33a, 34—34, 35—35, shown in FIGS. 31 and section 36—36 shown in FIG. 32.

Figure 37:
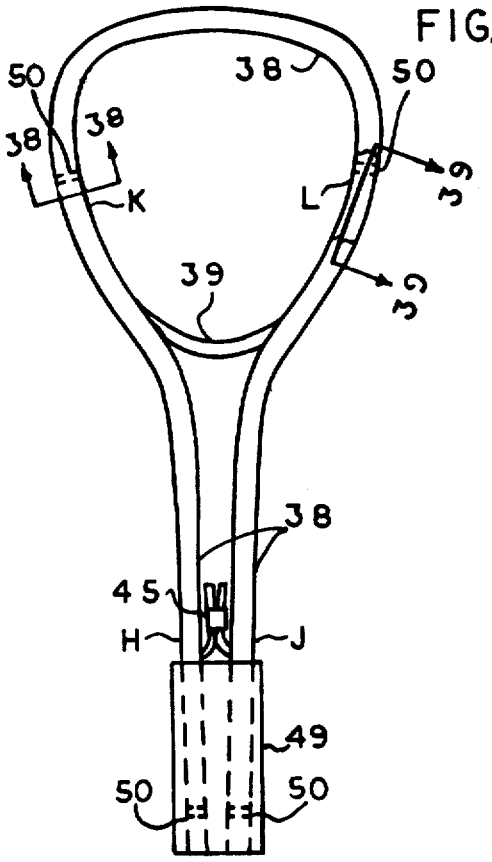

FIG. 37 is a front view of a racket which is another embodiment of the invention, which allows the moment of inertia to be changed by the player.

Figure 38:
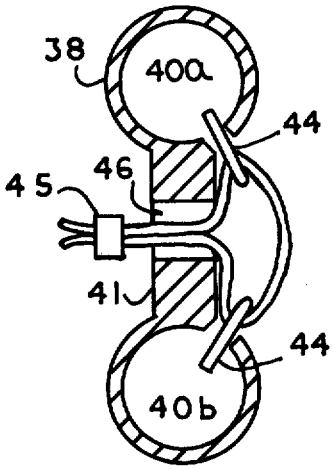

FIG. 38 is a crossectional view of the section 38—38 shown in FIG. 37.

Figure 39:
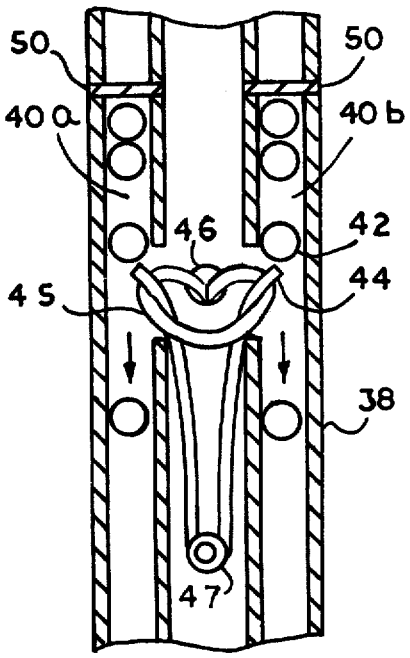

FIG. 39 is a crossectional view of the section 39—39 shown in FIG. 37.

FIG. 40 is a chart of results of tests made on prior art rackets fabricated in accordance with the objectives of this invention.

DESCRIPTION OF INVENTION

Figure 1:
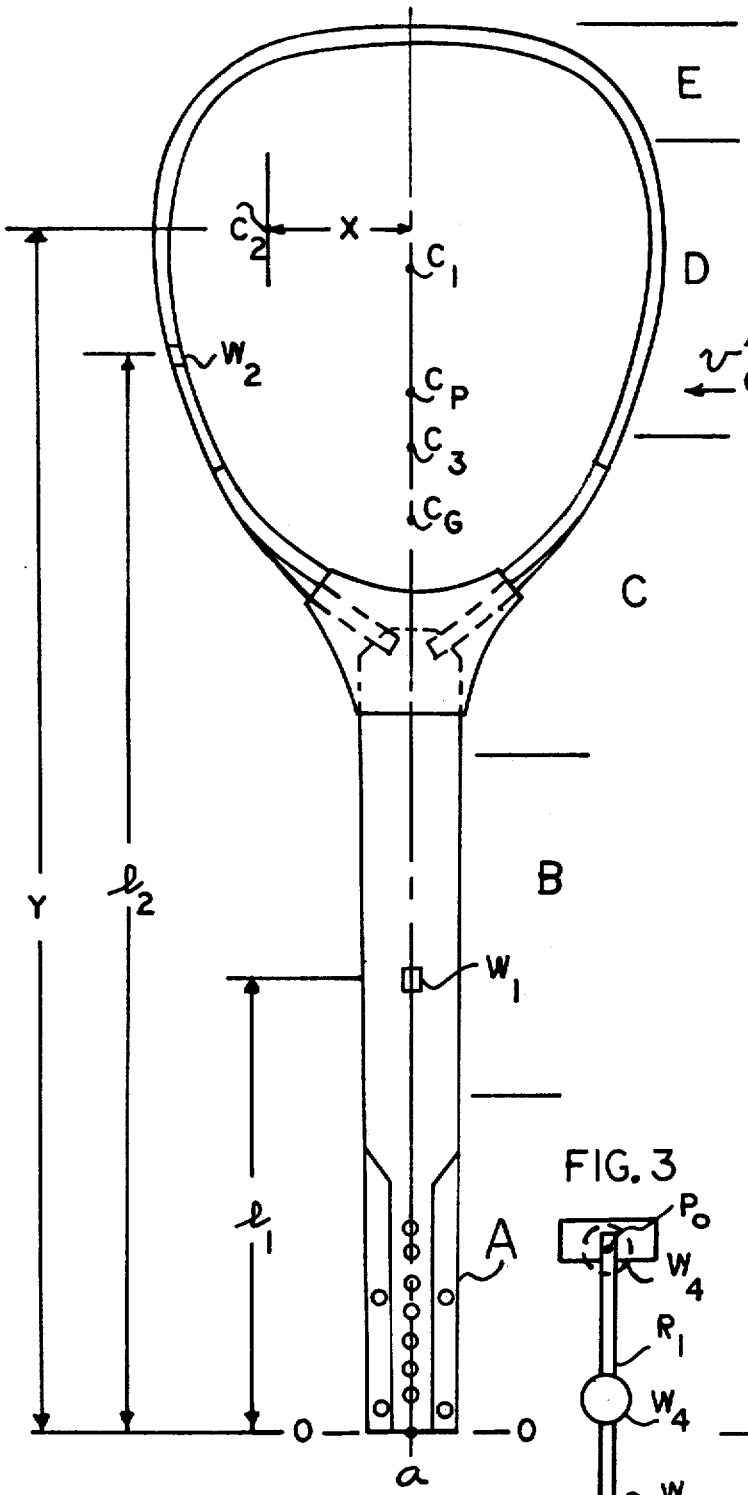
FIG. 1 is a front view of the racket, showing points of application of impulsive forces, axis of rotation, center of gravity and center of percussion.
Figure 2:
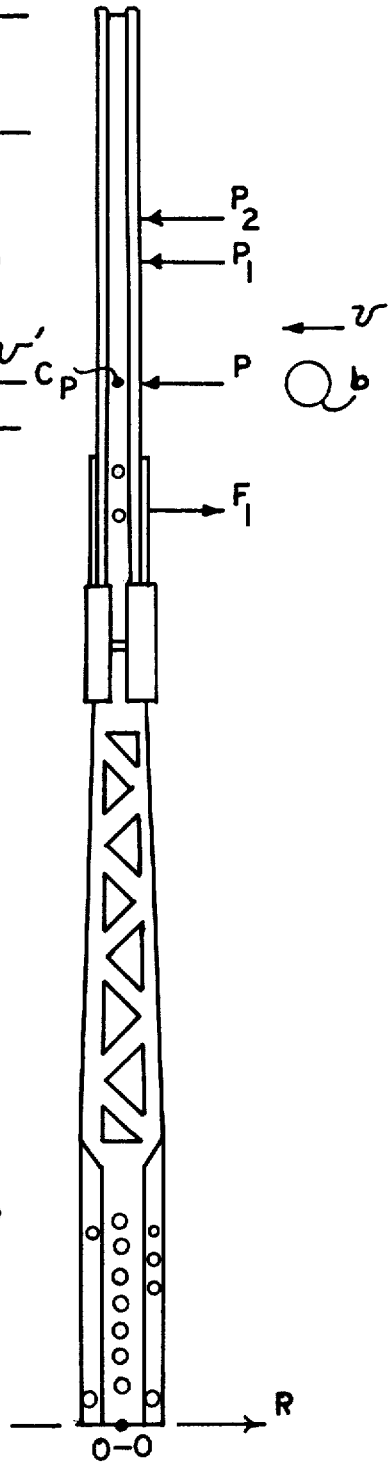
FIG. 2 is a side view of FIG. 1 and a ball traveling with a velocity v toward the racket.

If one imagines a racket to be suspended in space without any encumberances and it is struck by a ball, the racket, after the impact, will move and ball will also rebound. In FIGS. 1 and 2, if the ball strikes the racket at [C] $C_p$ such that point a does not move in space, the rest of the racket will rotate about the axis o—o. The point [C] $C_p$ is known as the center of percussion. The axis o—o at the end of the handle is against the heel of the hand, which is at the pivot point of the wrist joint. It can be seen that if the racket is struck at point other than $C_p$ such as $C_1$, above $C_p$, the axis o—o would move and if it is to be restrained a reaction force R is required. Likewise, if the point $C_3$ is below $C_p$ the reactive force R would be reversed. This reactive force R increases proportionately in magnitude when the point of impact departs from the point $C_p$. Thus, if the impulsive force is P between the racket and the ball, and the point of contact is $C_p$, there is no reactive force R at the handle. If the point of contact is not at $C_p$, but departs from $C_p$ by 10%, then the reactive force R at the handle is 10% of P.

It is very desirable to have the point $C_p$ placed out toward the center of the racket face.

Again returning to the racket suspended in space, when the racket is struck by the ball, the racket strings will deform and the ball will deform. The deformation of these bodies result in energy being stored in each and then being dissipated by vibration, heat and some of the energy being given back to the ball in its rebound motion. The energy stored in the strings is mostly given back to the rebound motion of the ball. The energy which remains in the vibration of the strings is a small portion of the energy stored since the weight of the strings is small compared to that of the ball.

About 55% of the energy stored in the ball is given back as rebound motion between the ball and the racket.

The energy stored in the racket frame due to its bending and torsion under the impact is mostly dissipated in the racket by vibrations. Furthermore, in order for the racket frame to give back some energy to the rebound motion of the ball, it must be moving in the direction of the ball's motion when it departs from the racket strings and this would occur infrequently. This action would be similar to a diver using a springboard which requires split second timing. Further, after the diver has left the board, the board vibrates violently, dissipating the energy. This is the job the strings should do, not the frame.

Thus, it can be concluded that deformation of the racket frame reduces the velocity of the ball's rebound and results in vibration of the racket frame after the ball has departed the strings. It is a feature of this invention to reduce this frame deformations in bending and torsion.

The velocity of the ball's rebound after striking the racket depends on the moment of inertia of the racket about the pivot axis, the weight of the ball, the velocity of the ball, and the velocity of the racket. It we again return to the racket as shown in FIGS. 1 and 2, and a ball b traveling with a velocity, v, with respect to the ground strikes the racket at the center of percussion, $C_p$, the racket will rebound from the impact by rotating about the pivot axis o—o and the velocity of the point $C_p$ will be v'. Theoretically, if the collision resulted in no loss of energy or momentum, and the moment of inertia of the racket about the axis o—o was 1012 ounce-inches$^2$, the ball would come to a complete stop with respect to the ground, and the velocity, v' of $C_p$, would be equal to v, the original velocity of the ball.

The value of 1012 ounce-inches$^2$ for the moment of inertia is obtained by multiplying the weight of the ball, 2 ounces, by the distance $C_p$ in inches squared, $(22.5)^2$. Thus, all the energy in the ball would have been given to the rotation of the racket. These conditions are based on the racket being stationary with respect to the ground prior to the impact of the ball. This action is similar to the result when a stationary pool ball is struck by the cue ball, in the game of pool. The pool ball which is struck is given the velocity of the cue ball, and the cue ball becomes stationary after the impact, regardless of how fast the cue ball was going originally.

However, if the [output] *point* $C_p$ of the racket had been moving with a velocity v, with respect to the ground, having the same magnitude as the velocity of the ball with respect to ground, then the amount of inertia would have to be 3 times, 1012 ounces in.$^2$, or 3036 oz. in.$^2$ for the racket to come to a complete stop and the ball would rebound with a velocity, 2v. Since the racket came to a complete stop, all the energy in the motion of the racket would be transferred to the ball, and hence under the conditions stipulated, could provide for the most efficient transfer of energy. It is noted that most of the rackets used possess moments of inertia about the handle end which are between 3000 and 4000 oz. in.$^2$. It is noted that when a player tosses a ball up for a serve, the ball has very little velocity in direction parallel to ground, thus the point $C_p$ of a racket possessing a moment of inertia of 1012 oz. in.$^2$, under the theoretical conditions, would momentarily come to a complete stop when it struck the ball and provide for the most efficient transfer of energy from the racket to the ball.

This analysis provides some insight about the transfer of the racket energy to the ball. The energy in the racket must come from the player's body. The optimum moment of inertia of a racket for a player to get the energy from his body to the racket depends on the player and his stroke. Considerable energy is available and this transfer of energy is not as critical as the transfer of the energy from the racket to the ball.

Thus, it can be concluded that a racket with much smaller amount of inertia about the handle end is required for the serve than for a ground stroke. It is noted that in baseball a batter hitting practice fly balls to the outfield by tossing the ball up similar to a serve, then hitting the ball, uses a very light swing weight bat, called a fungo bat. However, when facing a pitcher he uses a much heavier bat.

Thus, the moment of inertia of a racket about the handle end is a criteria for determining the striking power of a racket. The amount of inertia is sometimes called the swing weight of a racket.

It is an object of this invention to provide a racket which can have its swing weight changed by the shifting of weights for the serve and ground strokes.

If a weight, W, is added to the end of the handle, there is no change in the swing weight of the racket. If this weight is shifted to the center of percussion, the swing weight is increased by $W\ C_p^2$, and the center of percussion is not changed. Thus, if the shift in weight is from the handle end to $C_p$ and vice versa it does not affect the distance, $C_p$. If the weight is shifted to other than $C_p$, the center of percussion will be modified. This shift in weight can be accomplished by holding the head of the racket up and restraining round lead pellets in the handle end when serving and releasing them when hitting a ground stroke. The pellets can be retained in a tube within the racket handle and frame.

It has been observed that if the pellets are restrained in the handle end by a valve until the last part of the swing in a serve or a ground stroke and then released, considerable more impact is given to the ball. The pellets are placed back in the handle end by raising the racket head up and allowing the pellets to drop back into the handle end and opening the valve and then closing the valve. Mercury and a plastic tube may be used in place of the lead pellets.

Another object of this invention relates to a tennis racket which possesses the same striking power of swing weight as rackets of the prior art, but has a significant reduction in the weight, a significant increase in the center of percussion, a significant decrease in vibration and a significant decrease in flexibility, thereby resulting in a more efficient and accurate racket. This racket will minimize the development and aggravation of tennis elbow. This racket is fabricated of material which has a high stiffness per unit weight. Materials that can be used in descending order of stiffness are beryllium, graphite composite, boron composite, steel, aluminum, wood and fiberglass. At the present time aluminum is the most cost effective. The crossections of the racket at various points along its length is designed to provide sufficient stiffness with the minimum amount of material.

A formula which can be used to determine the amount of inertia or swing weight follows $$I_s = C_p C_g W \text{ in oz-in}^2$$

where $C_p$ = center of percussion in inches, the distance from the pivot point.

$C_g$ = center of balance or gravity, in inches the distance from the pivot point.

W = the weight of the racket in ounces.

The center of percussion is that point on the racket which, when struck by a force of short time duration, will cause no lateral shock or movement at the pivot point.

It can be shown that for a rigid body the distance the center of percussion is from the pivot point is identical to the distance of pendulum weight to the pivot point, when this distance is adjusted so as to take the same amount of time to complete one swing as the racket does when it is allowed to swing as a pendulum, with a small excursion. Thus, to find the center of percussion of a racket we support it at a pivot at the handle end, and measure the time for one complete swing. This is most accurately done with a stop watch and measuring the time for ten swings. The length of the pendulum and hence the center of percussion is given by $$C_p = 9.79\ T^2$$

where T is in seconds.

The pivot point selected was the end of the handle because the butt of the racket is usually resting against the heel of the hand which is very close to the wrist pivot joint. All measurements were taken on different rackets at the handle end for reference purposes. If the pivot point is selected at some other point such as four inches from the end, the center of percussion moves toward the center of the racket face somewhat, but is still below the center of the racket face. As long as comparisons between rackets are done from the same pivot point, the results of the analysis are the same.

We can analyze the affect of the removal or the addition of weight along the length of a racket by the following example.

Figure 3:
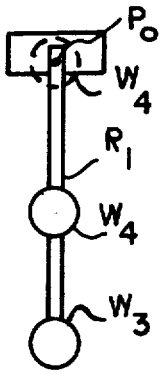
FIG. 3 is a view of a pendulum with two weights.

If we take a very thin light rod $R_1$ as shown in FIG. 3 and place a weight $W_3$ at its end and allow it to swing as a pendulum about the pivot Po, we can observe the affect of placing an additional weight $W_4$ equal to $W_3$ at various points along its length.

If $W_4$ is placed at the end of the rod $R_1$, the same point as $W_3$, the period of the swing will not change from what it was. If we place $W_4$ right over the pivot point Po so that the weight $W_4$ doesn't swing, the period again will remain the same. However, if we place the weight $W_4$ near the center of the rod the period will be shortened, indicating that the effective length of the pendulum has been decreased. Thus, the addition of weight to the throat portion of a racket is very detrimental in that it moves the center of percussion toward the handle more significantly than the addition of weight at the handle end. It is noted that when the weight $W_4$ was moved right over the pivot point the center of gravity was reduced in half. Thus, it is not enough to say that an increase in the distance of the center of gravity from the handle end will increase the center of percussion significantly.

The formula $$I_s = C_p C_g W$$

can be written $$C_p = I_s / C_g W$$

If we keep the swing weight the same, i.e. constant, we see that we must make the denominator $C_g$ W smaller to make $C_p$ larger.

The denominator is made smaller by making W smaller and keeping the magnitude of the increase in $C_g$ smaller than the magnitude of the decrease in W, thus the product of $C_g$ W will be made smaller. Refer to FIG. 1. If a particle of material of weight, $W_1$ in the handle at a distance of $l_1$ from the handle end is removed, the moment of inertia is reduced by $W_1 l_1^2$. If a particle of material of weight $W_2$ is added at a distance $l_2$, the moment of inertia is increased by $W_2 l_2^2$. If we select $W_2 = W_1 l_1^2 / l_2^2$, then $W_1 l_1^2 = W_2 l_2^2$, and there would be no overall net increase in the moment of inertia by the subtraction of $W_1$ and the addition of $W_2$. We note that $W_2$ is smaller than $W_1$ since $W_2 = W_1 l_1^2 / l_2^2$ and $l_1 < l_2$ Thus the total weight will be decreased. To attain the smallest weight, $l_2$ should be made as large as possible, which means that we should be adding the weight to the head end of the racket at approximately 27 inches, which is the length of most rackets.

To determine how much we affected the center of percussion by this subtraction of $W_1$ and addition of $W_2$ we examine the product of W $C_g$ and see how it changed.

$$W' = W - W_1 + W'_2 \text{ the new weight.}$$

$$C'_g = \frac{WC_g - W_1 l_1 + W_2 l_2}{W - W_1 + W_2} \text{ the new center of gravity.}$$

$$C'_g W' = \frac{WC_g - W_1 l_1 + W_2 l_2}{(W - W_1 + W_2)} \times (W - W_1 + W_2)$$

$$C'_g W' = WC_g - W_1 l_1 + W_2 l_2$$

$$= WC_g - W_1 l_1 + W_1 \frac{l_1^2}{l_2^2} \times l_2$$

$$= WC_g - W_1 l_1 \left(1 - \frac{l_1}{l_2}\right)$$

$$WC_g - C'_g W' = W_1 l_1 \left(1 - \frac{l_1}{l_2}\right)$$

Since $l_1/l_2 < 1$, $WC_g - [C_g W_1]$ $C_g'W'$ is always positive, hence $WC_g [<] > C_g'W'$ and the $C_p$ is increased.

As noted before, if we wish to have the lightest racket for a given moment of inertia, $l_2$ is chosen to be as large as possible and is fixed at the racket head end.

We can now see the affect of removing $W_1$ at different lengths, $l_1$.

The formula for the center of percussion is $$C_p' = I_s / C_g' W'$$

When the expression in the denominator is a minimum we have the greatest increase in $C_p'$. We examine this expression $$C_g' W' = WC_g - W_1 l_1 (1 - l_1/l_2)$$

We differentiate $$d(C_g'W')/dl_1 = -W_1(1 - 2l_1/l_2)$$

and equate to zero.

$$0 = (1 - 2l_1/l_2)$$

solve for $l_1$.

$l_1 = [2l_2]$ $l/2l_2$ for the minimum value of $C_g'W'$.

Thus, it is most effective to remove material from the middle of the racket and add it to the end to effect the greatest change in the center of percussion.

If material is removed from the end of the handle, $l_1$ is very small and hence $W'C_g'$ is not changed much nor is $C_p$ changed much.

The procedure followed in designing the racket is to make the weight of the racket as small as possible, by using only sufficient material at each point of maintain adequate strength and adequate stiffness at that point.

Figure 4:
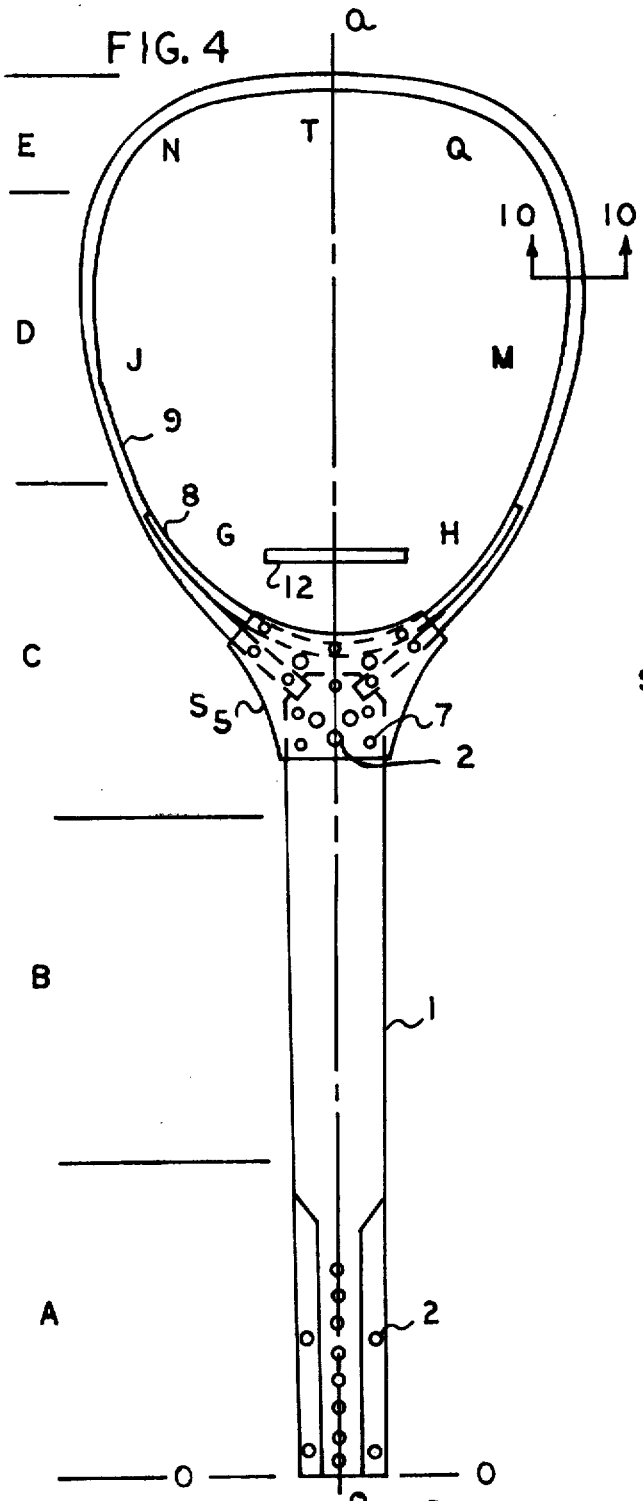
FIG. 4 is a front view of an embodiment of the invention.

Next we add weight to the racket head to increase the center of percussion and to attain the desired swing weight or moment of inertia. Shown in FIG. 1 and FIG. 4 is a racket showing various portions such as A, B, C, D, E. Material is removed from the grip portion A to reduce the overall weight. Sufficient material must be provided to withstand the grip pressure of the hand. Also, a large bending moment occurs at the junction of portions A and B at the instant of impact of the ball. Very little torsion stress is experienced by the material here because the hand cannot exert strong torsion in the short space of time of the ball impact. Reduction in the material from portion A will increase the center of percussion only slightly while the center of gravity will be increased greatly.

Material removed from the handle portion B and the addition of less material at the end of the racket will decrease the total weight of the racket, and will be effective in increasing the center of percussion. It will increase the center of gravity slightly. The stresses here are purely bending; that is, the material in the upper face is stressed in tension and lower face in compression. There is very little torsion. Material removed from the throat portion C will be most effective in increasing the center of percussion, and it will not effect the center of gravity very much. Considerable bending stress occurs in this portion and a large bending stress occurs at the center of gravity at the impact of the ball. In addition, torsion stresses occur in the throat arm portions. The throat arm portions must be reinforced to attain sufficient rigidity to prevent excessive vibration. This reinforcement must utilize the minimum amount of material. The upper part of the throat must also withstand the static tension of the strings and provide an anchor which is rigid.

Material removed from the head portion D and the addition of less material to the head end portion E is also effective in increasing the center of percussion, decreasing the center of gravity, and the overall weight slightly. The stresses in these members consist of a small bending moment when the ball impacts the racket and also the static tension imposed by the racket strings. These members must be sufficiently rigid to prevent movement when the ball impacts the racket and vibration thereafter.

Material in portion E should not be removed except to reduce the swing weight to the required value. There is no bending stress except the member must withstand the stress of the string tension. Sufficient material must be provided in the portion E near the axis a—a to withstand the bending stress of the string tension and also the additional tension at the impact of the ball. The material which is removed from the other portions and added to portion E should be added at the outer corners of the racket, at locations N and Q in FIG. 4.

The addition of material to the corner locations not only increases the center percussion of the racket, and determines moment of inertia to the value desired, it also increases the moment of inertia of the racket about the longitudinal axis, a—a.

The inertia about this axis is important since it determines how far off the longitudinal axis a ball can be hit before rotation of the racket in the hand of the player results in a weakly hit inaccurate return of the ball.

Refer to FIG. 1 and FIG. 2. If the ball strikes the racket face at the point $C_2$ at a distance X from the longitudinal axis a—a, a torque exists for a short interval of time.

This impulsive moment results in an angular momentum about a—a and is found by $P_2X=I_aw_a$.

Where $w_a$=the angular velocity about the axis a—a $I_a$=the moment of inertia about the axis a—a $P_2$=the impulsive force caused by the impact of the ball.

The angular momentum about the axis o—o is given by $$P_2Y=I_oW_o$$

where $w_o$=the angular velocity about the axis o—o $I_s$=moment of inertia about the axis o—o The ratio of the angular momentums is, $$I_aw_a/I_sw_o=X/Y$$

For a given ratio of $w_a/w_o=K$, which corresponds to a given degree of a poorly hit ball.

$$K(I_a/I_s)=X/Y$$

Thus the higher the ratio $I_a/I_s$, the greater one can hit the ball off the center longitudinal axis, at a given distance Y.

$$X=KY(I_a/I_s)$$

This analysis is based on the observation that the hand cannot prevent the racket from turning at the instant that the ball is hit off the center longitudinal axis. Slow motion pictures taken at 64 frames a second and 1/500 second exposure show the racket to turn at times as much as 60 degrees and then return in 1/64 of a second.

Thus, the moment of inertia about the axis a—a is the primary factor in determining how far off the longitudinal axis a miss hit ball can be tolerated.

A weight which is added to the racket at a maximum distance from the axis a—a is most effective in increasing this moment of inertia.

The moment of inertia about the axis a—a can be determined by suspending the racket from the handle end by a carrier and a length of wire. The other end of the wire is fixed in a heavy body which is held in the observer's hand. The racket is caused to oscillate in torsion and the time of one oscillation is measured. The carrier itself is allowed to oscillate and its period is measured.

Then $I_2=I_1(T_2^2-T_o^2)/(T_1^2-T_o^2)$ where $I_2$=unknown moment of inertia $I_1$=known moment of inertia $T_2$=period of racket $T_1$=period of bar with known moment of inertia $T_o$=period of torsional carrier This method of measurement is described in the U.S. Pat. No. 3,473,370 by Emil Marcinak, and is used on a golf club.

With regard to the stiffness of the racket, it is noted, that if the racket is designed to obtain the most desired rigidity, it will be strong enough to withstand the stresses required to prevent bending or breaking.

Refer to FIG. 1 and FIG. 2 when a ball strikes the racket with a force $P_1$ at point $C_1$, the force $F_1$ at the center of gravity is in the opposite direction. This gives rise to a large bending moment occurring at the center of gravity. If the center of gravity has been moved up to the throat portion C from portion B, a much stronger and rigid crossection exists than the crossection at the top of the handle in the portion B. Hence the racket will be stiffer.

When a racket is struck it vibrates in discrete modes at discrete frequencies.

The mode of vibration and the frequency is determined by the stiffness, weight, the weight distribution of the racket, and the manner in which the racket is held.

The more flexible a racket is, the lower the frequency of vibration will be and also the greater the amplitude of the vibration will be.

The amplitude of a particular mode of vibration also depends upon where the racket is struck.

Some modes of vibrations have points which do not move with respect to the ground during the vibration. These points are known as nodal points. When a racket is held at a nodal point and the racket is caused to vibrate in the mode associated with this nodal point, the vibration is not affected very much by the means by which the racket is held, and the vibration lasts longer. The frequency of this free vibration is determined by the stiffness, the weight and the weight distribution alone.

It has been observed that the vibration in metal rackets persist for a longer period of time after they are initiated, than the vibrations in wood or composite rackets, or rackets which employ vibration damping material. The wood and and plastic material dampens the vibrations. However, the vibrations are present and can be observed for a short interval of time.

There are many ways to hold a racket when testing for vibration. Two significant ways of holding the racket when testing for vibration are:

Holding the racket only at a nodal point near the handle end and holding the racket in a heavy vise six inches from the handle, as a cantilever.

The frequency of vibration when the racket is held in a player's hand is close to the frequency observed when it is held at the nodal point near the handle end.

One of the modes of vibration of a racket occurs when the center of gravity moves with respect to the racket head end, and the handle end, and both ends are free to vibrate.

This mode of vibration can easily be observed by holding the racket handle between the forefinger and thumb at a point so that the pivot axis is parallel to the racket face and then striking the head end perpendicular to the face and noting the strength of the vibration. The point at which the racket handle is held is moved up or down, and the process repeated until the vibration is observed to last the longest length of time. On prior art rackets this nodal point is about six inches from the handle end. There are other nodal points at which the racket may be held, and these other points occur on each side of the racket frame head approximately opposite the center of the racket face. If the racket is held by forefinger and thumb at either of these two points and the handle end is struck, strong vibrations occur, and there is little interference with the free vibrations of the racket. Also, if the racket is held by the strings in the center of its face, strong vibrations will be observed when the racket handle is struck.

These nodal points vary from racket to racket depending on the design.

The strings vibrate also when the center of the racket face is struck by a ball. The strings move perpendicular to the face of the racket frame. The center of the racket face strings is known as a pole or anti-node, since when it is struck it moves the most and vibrates the most. Also, if designed properly, the face frame becomes a nodal line for the vibration of the strings, so that very little of the string vibration is transmitted to the frame head when the racket face strings are struck in the center.

The racket can be caused to vibrate in a direction parallel to the face of the racket by holding the handle so that the pivot axis is perpendicular to the face of the racket, and the racket head is struck parallel to the racket face.

As mentioned when the racket is held at the nodal point near the handle end, and the head end is struck strong vibrations are observed. However, if the racket is held at the nodal point near the handle end and the racket is struck at the nodal point in the center of the racket face or on the nodal points in the head frame opposite the center, the amplitude of the vibration associated with these nodes will not be present in the vibration. Likewise, if the racket is held at one of the nodal points in the head end and the racket is struck at the node at the handle end, the vibration associated with these nodes will not be present.

Hence, if a ball strikes the racket in the center of its face opposite to the nodes in the frame, vibration of the center gravity with respect to the head end and handle end will not be initiated. Further vibration of the strings will not be transmitted to the head face frame, since the head face frame is a nodal line for the string vibration.

It is very desirable to design the racket to have nodes located in the frame head at points opposite the center of the racket face, and have the head frame a nodal line for the vibration of the strings.

As mentioned, another method for holding the racket when testing it is to hold the handle end in a heavy vise six inches from the end. The racket is caused to vibrate by striking it at particular points to observe a particular mode of vibration.

Vibrations perpendicular to the face can be caused by striking the head end in a direction perpendicular to the face and vibrations parallel to the face can be caused by striking the racket in a direction parallel to the face. The torsional vibration can be caused by striking one side of the head frame opposite the center of the face and holding the head end of the racket with the tip of the forefinger to dampen out other modes of vibration.

Other modes of vibration occur in prior art rackets. The frame can vibrate in a direction perpendicular to the face of the racket, in a direction parallel to the face of the racket, and the head end of the frame can vibrate in torsion with respect to the racket handle. There are other modes which are peculiar to a particular design. In addition, each frequency of vibration can have related overtone frequencies of vibrations and modes.

These modes of vibration can be observed by placing a piezo-electric crystal pickup, which generates a voltage when stressed, at various points on the racket frame, and feeding the voltage generated by the vibration at that particular point to the vertical plates of a cathode ray oscilloscope. A calibrated variable audio voltage oscillator is fed to the horizontal plates of the oscilloscope. When the frequency of the crystal voltage and the audio voltage oscillator are the same, a visual elliptical pattern is observed on the oscilloscope cathode ray tube.

To observe the voltages caused by the vibration of the center of gravity with respect to the handle end and the head end, the crystal is placed near the handle end and the racket is struck at the head end. The racket is held between the forefinger and the thumb at the node near the handle end.

To observe the voltages caused by the vibration of the strings the crystal pickup is placed at one of the nodes in the frame head, and the center of the strings is struck. The racket handle is held in one hand. Vibration of the center of gravity will be minimized and the voltages caused by the string vibration will be emphasized.

To observe the voltages by the vibrations perpendicular to the face, the frame is struck in a direction perpendicular to the face.

To observe the voltages caused by the vibrations parallel to the face of the racket the frame is struck in a direction parallel to the face.

To observe the voltages caused by the torsional vibrations of the racket head, the handle end is held in a heavy vise. The racket is struck at the other node in the head frame opposite the face center, in a direction perpendicular to the racket face. The center of the head end is held with the tip of the forefinger to dampen out vibrations other than the torsion vibration.

To observe the voltages caused by other modes of vibration of the head frame, the crystal pickup is placed at one of the nodes in the head frame opposite the center of the racket face, and the racket is struck at the other node in the head frame. The racket is held by the handle in the other hand.

The frequency of vibration of a racket supported near the handle end and the head end as a beam can be approximated by the formula $f=\sqrt{K_1/D_g}$ where $D_8$ = the deflection of the center of gravity under its own weight, and $K_1$ = a factor which is dependent on the racket weight and also the weight distribution along its length.

Thus, the smaller the deflection, the higher the frequency of vibration will be.

However, in comparing rackets of different designs, the factor $K_1$ is somewhat different for each racket; hence, the frequency will not be exactly inversely proportional to the square root of the deflection from racket to racket.

The deflection of the racket as a beam under its own static weight, when it is supported at the node near the handle end and the nodes at the head end is very small, and it is difficult to measure. When a ball strikes the racket, the weight of the racket is effectively increased by the acceleration of the racket and, hence, the deflection of the center of gravity is momentarily increased, which then results in the vibration of the racket.

The deflection of the racket as a beam under its own weight can be related to the deflection of the racket as a beam, when additional static weight is placed over the center of gravity, and the racket is supported at the node near the handle end and the nodes near the head end, by appropriate beam deflection formula.

Measurement of this deflection at the center of gravity when a weight is placed over the center of gravity is related to the performance of the racket at the instant of impact, and the subsequent vibrations of the racket which occur.

When the racket is held in a player's hand and it strikes a ball, the racket is also stressed as a cantilever. The head end of the racket deflects with respect to the handle end held by the player, and the racket end vibrates subsequently as a cantilever.

The deflection of the racket head end when the handle end is held in a heavy vise six inches from the handle end, and a weight is placed at the center of the racket face is related to the performance of the racket at the instant of the ball impact and subsequent vibration of the racket.

The frequency of vibration of the racket head end with respect to the handle end can be approximated by the formula $$f_3 = \left[\frac{\sqrt{g}}{2\pi}\sqrt{\frac{l_3 l_4 W}{I_c D_3}}\right] \frac{\sqrt{g}}{2\pi}\sqrt{\frac{l_3 l_4 W_3}{I_c D_3}}$$

where $f_3$ = the frequency of vibration, in cycles per second $g$ = the acceleration of gravity in inches per squared second $D_3$ = the deflection of the racket head end in inches $l_4$ = the distance of the racket head end from the cantilever base, in inches $w_3$ = the weight added to the racket face center in ounces $l_3$ = the distance of the racket face center to the cantilever base, in inches $I_c$ = the moment of inertia of the racket about the cantilever base, in ounce-inches squared The amplitude of vibration and deflection as measured when the racket is held in a vise as a cantilever is much greater than that which is experienced when a racket is held by a player's hand, since the player's hand is not capable of gripping the racket as rigidly as a vise, and it does not have the weight the vise has. The hand acts more as a pivot point and a weight at the pivot point.

As mentioned previously, the vibrations measured when the racket is caused to vibrate freely and holding the racket at the node near the handle end is closely related to the frequency measured when the racket is held in a player's hand, and the racket is [strung] *struck* at the [hand] *head* end by a ball.

As previously mentioned, the nodal point of a racket does not move with respect to the ground when a racket vibrates in a mode that is associated with that node. To determine the location of the nodes, the racket is held between the forefinger and thumb, and the racket is struck at the head end. The point at which the racket is held is shifted up and down until the vibrations caused by the impact of a small rubber hammer at the head end persist the longest. The position at which the racket is held is the node in the handle end. By placing the piezo crystal pickup near the handle end and feeding the voltage to the oscilloscope, the amplitude of the vibration can be measured by the amplitude of the visual pattern on the cathode ray tube. By striking the racket head with the rubber hammer in the vicinity of the nodes in the center of the racket face until the minimum amplitude is observed, a more precise location of the node in head can be determined. The nodes in the sides of the head frame can also be determined this way. Further, if the racket is held at one of the nodes in the head, and the racket handle is tapped with the rubber hammer in the vicinity of the node in the handle, a more precise location of this node can be determined, when the minimum amplitude of vibration is observed on the oscilloscope.

When the weight is added directly at a nodal point, there is no shift in the nodal position, since that point doesn't move during the vibration anyway, and no energy is imparted to the additional weight.

It has been observed that when the center of percussion is moved toward the head end of the racket, and the racket is made to be stiff and have little vibration, the node near the handle end moves away from the handle end toward the head of the racket.

This nodal point in prior art rackets occurs approximately six inches from the handle end.

Rackets made in accordance with the objectives of this invention have nodal points much farther away from the handle end.

In order to illlustrate the marked differences between rackets made in accordance with the objectives of this invention and prior art rackets, a series of tests and measurements as described in this invention were made and the results are tabulated in FIG. 40. All distances are in inches measured from the handle end.

The various tests have been described previously; however, some tests are further described and discussed.

The code used in FIG. 40 to designate the racket under test is as follows:

Y, represents a Yonex aluminum racket of prior art.

H, represents a Headmaster aluminum racket of prior art.

D, represents a Dunlop steel racket of prior art.

TA, represents a TAD wood racket of prior art.

TE, represents a Tensor aluminum racket of prior art.

W, represents a Wilson steel racket of prior art.

1, represent a racket similar to the embodiment of FIG. 31 without the openings 36.

Figure 17:
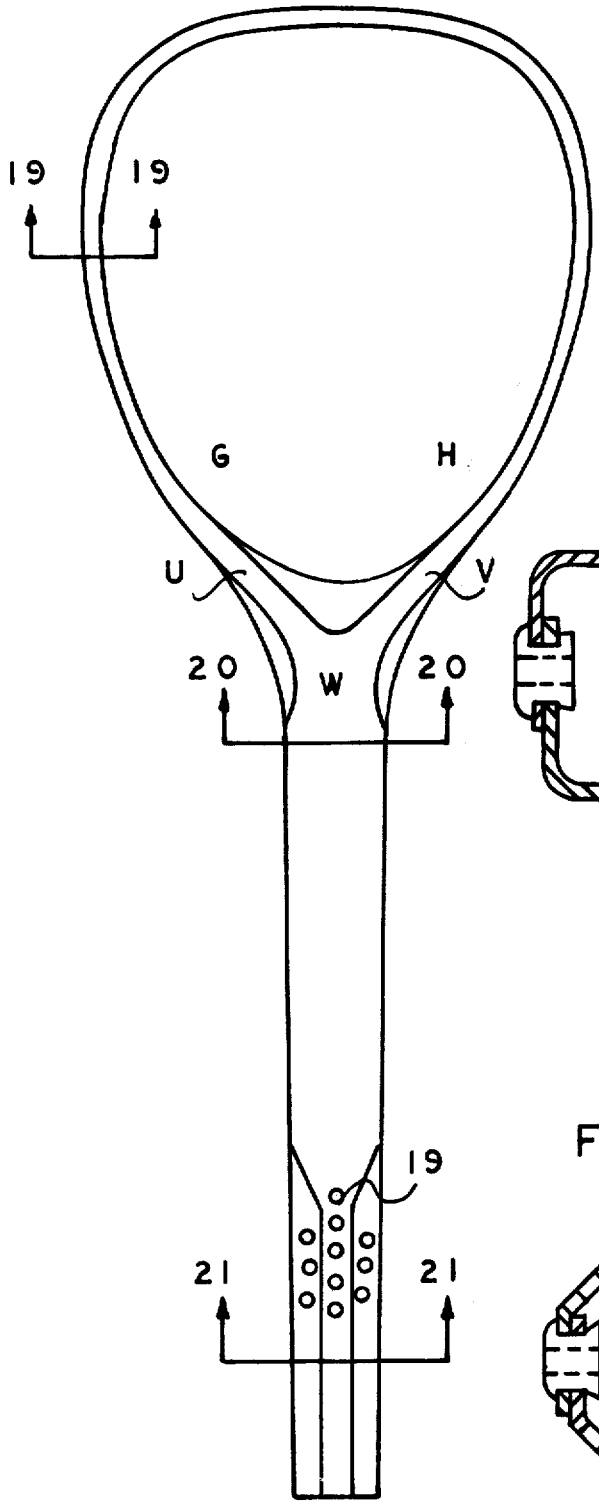
FIG. 17 is a front view of another embodiment of the invention.

2, represents a racket similar to the embodiment in FIG. 17, but provided with an attached tubular aluminum handle with a fiberglass grip.

Figure 27:
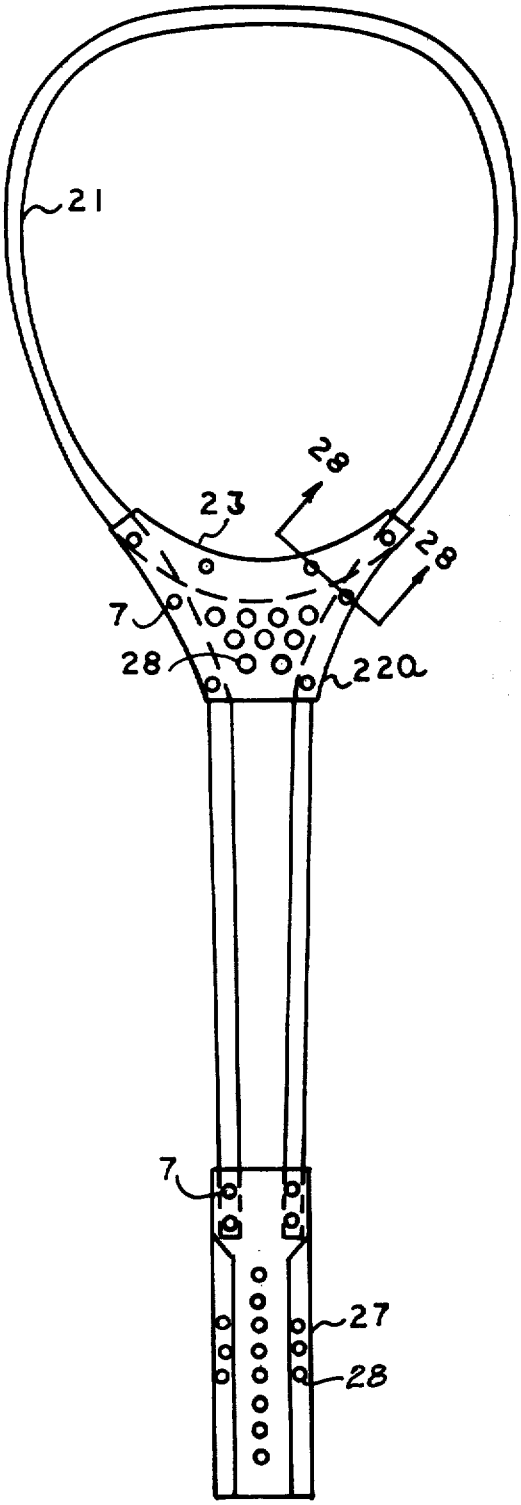
FIG. 27 is a front view of a racket which is another embodiment of the invention.

3, represents a racket similar to the embodiment in FIG. 27.

Figure 15:
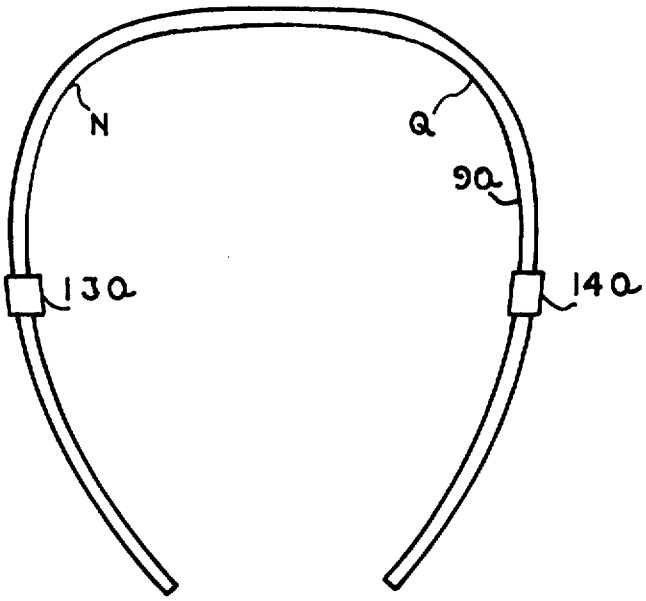
FIG. 15 is a front view of an alternate component member 9 of FIG. 4 and FIG. 8.

4, represents a racket similar to the embodiment in FIG. 4 without the openings 4 and without the weights 13a and 14a of the embodiment in FIG. 15.

5, represents a racket similar to the embodiment in FIG. 4 but was repaired due to breakage in fabrication.

6, represents a racket similar to the embodiment in FIG. 17, but repaired due to the breakage in fabrication.

7, represents a racket similar to the embodiment in FIG. 4, without the openings 4.

Rackets designated above 1 through 7 were hand made. With the use of proper tools and facilities for heat treatment, forming, punching, and molding of composite materials, substantial improvement in the performance of these models can be obtained. The columns in FIG. 40 indicate:

Col. 1, the racket under test.

Col. 2, Test 2, for the length of the racket [p1]

Col. 3, Test 3, for the face center.

Col. 4, Test 4, for the center of percussion. The racket is supported at a piviot at the handle end. The racket is caused to swing as a pendulum having a small amplitude for more than 10 consecutive swings. The time T in seconds, is measured for the pendulum to complete 10 swings. The center of percussion $C_p$ in inches, is given by the formula $C_p=9.79\ T^2$.

Col. 5, Test 5, for the difference of Col. 3 and Col. 4 divided by Col. 4.

Col. 6, Test 6, for the cener of gravity.

Col. 7, Test 7, for the weight in ounces.

Col. 8, Test 8, for the ratio of Col. 6 to Col. 4.

Col. 9, Test 9, for the product of Col. 6 and Col. 7.

Col. 10, Test 10, for the moment of inertia about the the axis o—o, in ounce-in$^2$, shown in FIG. 1.

Col. 11, Test 11, for the moment of inertia about the axis a—a, in ounce-in$^2$.

Col. 12, Test 12, for the ratio of Col. 11 to Col. 10.

Col. 13, Test 13, for the frequency, $f_1$, in cycles per second, of vibration perpendicular to the racket face with the ends free, and the racket is held at the nodal pivot at the handle end. This mode of vibration has a node near the handle end and a node in each side of the head portion of the frame near the head end of the racket.

Col. 14, Test 14, for the deflection perpendicular to the racket face, $D_1$, in inches of the middle of the racket between the ends when a weight of 80 ounces is applied to the middle of the racket, and the racket is supported six inches from the handle end, and the head frame sides are supported at points opposite the center of the face.

Col. 15, Test 15, for the distance of the node closest to the handle end, from the handle end, associated with the frequency $f_1$. The racket is held between the forefinger and thumb in the vicinity of the node located in one side of the head portion of the frame. The racket is tapped repeatedly with a rubber tipped hammer along the longitudinal axis of the racket in a direction perpendicular to the face of the racket, in the vicinity of the node located near the handle end. The location at which the minimum amplitude of vibration occurs when tapped, having the frequency $f_1$ is the precise location of the node.

Col. 16, Test 16, for the frequency, $f_2$, in cycles per second, of the vibration parallel to the racket face when the ends are free and the racket is held at node near the handle end. This mode of vibration has a node near the handle end and a node in each side of the head portion of the frame near the head end of the racket.

Col. 17, Test 17, for the deflection parallel to the racket face, $D_2$, in thousandths of an inch at the middle of the racket frame between the ends when a weight of 80 ounces is applied at the middle of the racket frame, and the racket is supported as a beam six inches from the handle end, and also at head frame side at a point opposite the center of the face.

Col. 18, Test 18, for the frequency, $f_3$, in cycles per second, of the vibration perpendicular to the racket face, when the racket handle is held in a heavy vise as a cantilever six inches from the handle end. This mode of vibration has no nodes. The base of the cantilever is not considered a node.

Col. 19, Test 19, for the deflection $D_3$ in thousandths of an inch of the head end of the racket perpendicular to the face, when the racket is held as a cantilever by a downward force on the handle end, and an upward force applied six inches from the handle end when a weight of 15.62 ounces is applied at the center of the racket face.

Col. 20, Test 20, for the frequency, $f_4$, in cycles per second, of the vibration of the racket parallel to the racket face when the racket is held in a heavy vise six inches from the handle end. This mode of vibration has no nodes. The base of the cantilever is not considered a node.

Col. 21, Test 21, for the deflection, $D_4$, in inches of the head end of the racket parallel to the face of the racket, when a weight of 15.62 ounces is applied to the center of the racket face, and the handle is supported as in test 19.

Col. 22, Test 22, for the frequency, $f_5$, in cycles per second, of the racket in torsion, when the racket is held in a heavy vise as a cantilever six inches from the handle end. The torsional mode of vibration is initiated by striking the racket on one side of the head frame opposite the center of the face. The frame is held at the center of the head end with the tip of the forefinger to dampen out vibrations other than the torsional vibration. This mode of vibration has no nodes. The base of the racket held by the vise is not considered a node.

Test Number 5 indicates the distance between the center of percussion and the center of the face divided by the distance of the center of percussion. The center of the face has the softest deflection to the impact of the ball compared to other impact points on the face of the strings. This results in the most efficient rebound of the ball from the strings, since the strings are doing more work at this point, and they are more efficient than the deformation of the ball. The impact of the ball at the center of percussion of the racket frame results in the most efficient rebound from the frame, since no energy is lost in movement of the reaction force at the handle end. The closer these points are, the more efficient the overall rebound of the ball is.

Test Number 8 indicates the ratio of the center of gravity to the center of percussion. The more ideal the racket design, the closer this ratio approaches the value 1. This is explained as follows:

For a given moment of inertia, the ideal racket would have all its weight concentrated at the point which contacts the ball. The handle and frame would weight nothing and be perfectly rigid. The strings would weigh nothing.

The formula previously given $I_s = C_p C_g W$, would pertain.

If the ratio of $$C_g/C_p = K_2,$$

then $$I_s = K_2 C_p^2 W$$

For a given moment of inertia, and a given distance for the center of percussion, the minimum weight W would occur when $K_2$ is as large as possible.

In the case where the weight is concentrated at one point $$C_p = C_g$$

and $$K_2 = 1$$

This is the largest value $K_2$ can have. The ratio of $C_g/C_p$ is a measure of how ideal the weight distribution of the racket is.

As an indication of how $K_2$ varies with the weight distribution, the value for $K_2$ for a uniform crossection bar is $$K_2 = 0.75$$

whereas for the weight concentrated at a point $$K_2 = 1.0$$

Test Number 9 indicates the product of the weight W in ounces, times the distance of the center of gravity, in inches. If a player holds the racket in his hand with the handle parallel to the ground, this product indicates the static bending moment the player feels at his wrist. The smaller this moment is the less strain on the player's wrist and arm. Further for a given moment of inertia about the axis, o—o, the smaller this product is the larger the distance the center of percussion will be from the handle end.

An embodiment of the invention is shown in FIG. 4. The handle 1 of the racket is formed of type 7075 T6 aluminum, 0.020 inches thick sheet with two edges fastened together with pop rivets. The handle end grip portion A is formed to be six sided polygon, with the upper and lower faces of $S_1$ and $S_2$ in FIG. 5 to be larger. The surface of the portion A is perforated with holes 2 to provide for air circulation, cushioning for shocks to reduce the weight, and to provide for drainage holes for sweat from the player's hands. The surface may be covered with a thin epoxy coating to present a warm feeling for the hand, or with a light porous nylon sleeve, or a perforated leather or rubber sleeve. Further, a sweat absorbing sleeve 3 in FIG. 6 may be inserted inside the handle contacting the inside surface, and the sweat drainage holes.

The handle extends into portion B which must withstand bending when the racket is swung and also when the ball is struck.

Figure 5:
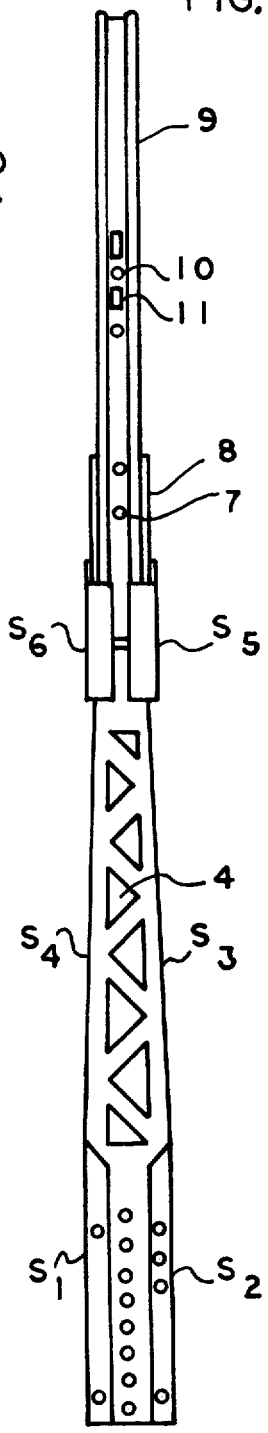
FIG. 5 is a side view of FIG. 4.
Figure 6:
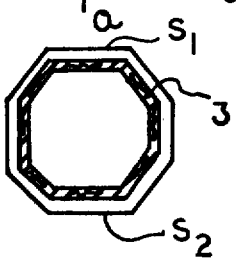
FIG. 6 is a bottom view of FIG. 4.
Figure 8:
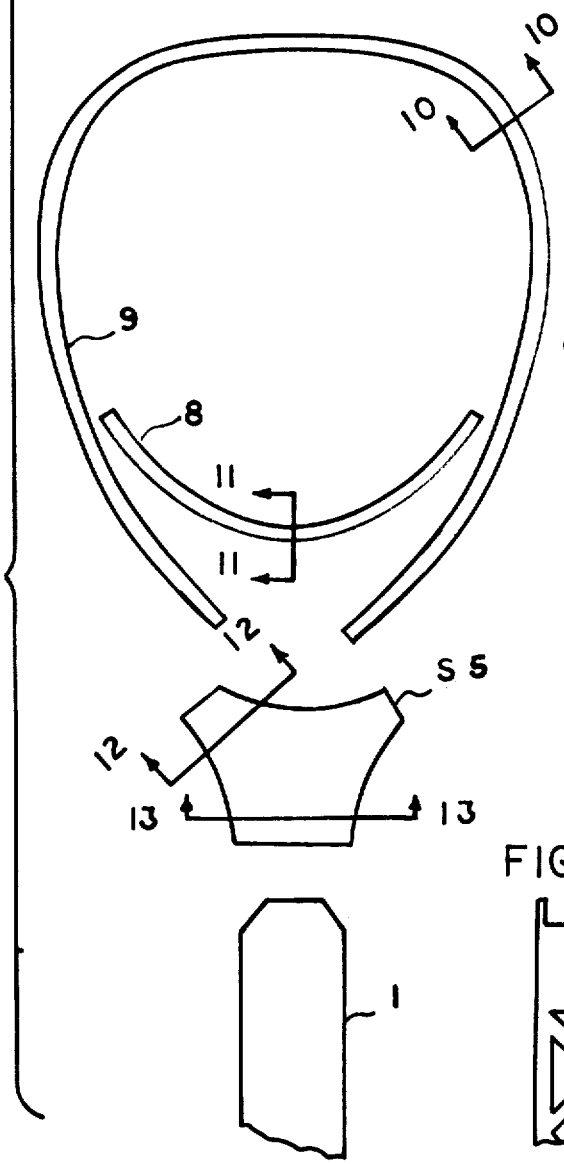
FIG. 8 is an expanded assembly of the component members of FIG. 4.
Figure 9:
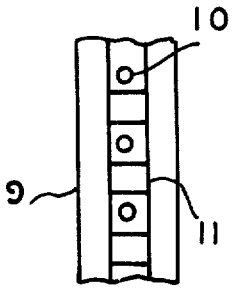
FIG. 9 is a side view of a portion of a component member 9 of FIG. 4 and FIG. 8.
Figure 12:
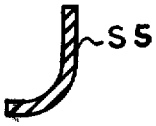
FIG. 12 is a crossection view of section 12—12 of member S5 of FIG. 8.
Figure 13:
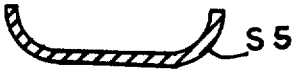
FIG. 13 is another crossection view of section 13—13 of member S5 of FIG. 8.
Figure 7:
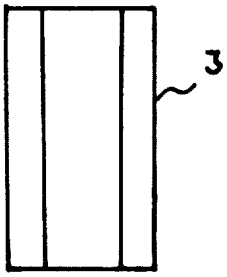
FIG. 7 is a front view of a sweat absorbent sleeve handle insert.

Portion B has the sides perforated with openings 4 as shown in FIG. 5, to remove material and reduce the weight. The edges of the openings 4 are bent inward to provide for more rigidity to keep the upper and lower surfaces $S_3$ and $S_4$ in FIG. 5 in place when the racket is stressed. In FIG. 4 and FIG. 5, throat portion C has the plates $S_5$ and $S_6$ riveted to the handle by the use of steel "pop" rivets, 7. In addition, the surfaces of the plates and handle which are in contact are cleaned thoroughly and then coated with an epoxy glue. These plates are fabricated of type 7075-T6 aluminum, 0.020 thick. They may be perforated with holes, 2, again to reduce the weight. The reduction in weight in this area is very important in causing the center of percussion to be moved further out from the handle end. Sufficient material must be provided to obtain the required rigidity. It is known that when a [number] *member* is stressed in bending, the outer most material from the neutral axis does most of the work and receives the most stress. By using two plates situated as the outer most surfaces provides for the greatest stiffness per unit of weight. The plate $S_5$ is also shown in FIG. 8. FIG. 12 and FIG. 13 are views of the crosssection 12—12 and 13—13 shown in FIG. 8 of the member $S_5$.

Figure 11:
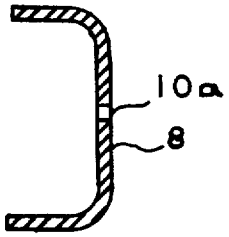
FIG. 11 is a crossection view of section 11—11 of member 8 of FIG. 8.

FIG. 8 is an expanded assembly of FIG. 4. Shown in FIG. 8 is a curved member 8 which is also shown in FIG. 4 and FIG. 5. The crossection 11—11 of this member in FIG. 8 is shown in FIG. 11. This curved member 8 provides a rigid anchor for the strings to feed through. Steel "pop" rivets 7 are used to attach this member to the head frame 9 and the members $S_5$, $S_6$ and the handle 1 shown in FIG. 4. In FIG. 4, locations G and H shown in portion C are stressed in torsion as well as bending.

Further, this torsional stress in location G and H is increased on the inside edge of the frame 9 and member 8 facing the racket face center by the shear stress caused by the impact of the ball. The addition of member 8 gives the required additional strength and rigidity for these stresses.

Figure 10:
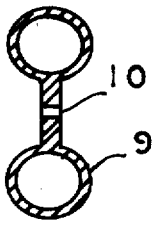
FIG. 10 is a crossection view of the section 10—10 of component 9 of FIG. 4 and FIG. 8.

In FIG. 4, the locations J and M of the frame 9 shown in the portion D must withstand the tension of the strings, and has less and less bending stress as the stress proceeds toward the end of the racket. In FIG. 5, the sides of the frame 9 are perforated with holes 10 for the strings to pass through the additional openings 11 are provided to reduce the weight as shown. The crossection 10—10 of FIG. 8, of the extruded aluminum frame 9 is shown in FIG. 10. Since the main stress is compression and tension in the upper and lower surfaces, as much of the material as possible should be placed there. To increase the resistance to warping the upper and lower areas are made in hollow tubes which give the crossection more strength in torsion. The crossection used in this embodiment is shown in FIG. 10. Many other crossections may be used. The weight of the extruded tubing prior to reducing te weight by putting openings in the central web area was 0.16 oz/inch.

In FIG. 4, in the head end portion E material from the frame 9 is not removed from the corner locations N and Q. Since the material in these corners provide for the least amount of weight to achieve the required moment of inertia about the longitudinal axis a—a, and also the required moment of inertia about the axis o—o through the end of the handle parallel to the face of the racket and perpendicular to the handle length. Material may be removed from the central location T since it does not contribute to the moment of inertia about the longitudinal axis a—a. However, sufficient material must be used to withstand the bending caused by the static string tension, and also the increased string tension when the ball is struck by the racket.

Figure 14:
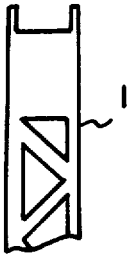
FIG. 14 is a side view of the handle member of FIG. 8.

FIG. 14 shows a side view of the handle 1.

In FIG. 4 is shown a strip 12 of sticky mastic material with a vinyl plastic outer coating on one side placed upon the strings. It has been found that when a ball is struck the strings vibrate and give rise to a loud audio sound, such as a "bong". Placing the mastic tape at various locations dampens this sound. The more the strip is lengthened, and with the use of additional strips at the head end, sides and center, the sound can be caused to be quite dead. The ball bounces from the racket with a dull sound. The use of the strip is at the desire of the player. It is easily applied and removed by the player, by placing two strips face to face from opposite sides of the racket strings. A strip 12 at the location shown approximately 5 inches long and ¼ inch wide resulted in a very pleasing sound. The use of the strip prevents excessive vibration and wear of the strings as well.

Shown in FIG. 15 is an embodiment wherein the frame 9 in FIG. 4 has been modified and is shown as 9a. Weight is removed from the locations N and Q and by additional openings 11, as shown in FIG. 5. Additional weights 13a and 14a are placed opposite the center of the racket face at the locations J and M. The additional weights that are placed at locations J and M increase the moment of inertia of the racket about a longitudinal axis a—a shown in FIG. 4. This additional weight also increases the overall weight of the racket from the minimum weight which is required to attain the required moment of inertia about the axis o—o.

For example, a racket having a minimum weight for a given moment of inertia about the axis o—o, and also a large moment of inertia about the longitudinal axis a—a would have as much weight located in the corners N and [M] *Q* as permissible. Having chosen a moment of inertia about the axis o—o, the moment of inertia of the racket about the longitudinal axis a—a may be increased by removing material from the corner locations N and [M] *Q* of the frame which are 27 inches from the handle end and adding weights 13a and 14a to the frame sides at the locations J and M, which are 21.5 inches from the handle end, opposite the center of the racket face. In order to keep the moment of inertia about the axis o—o the same, the weight of the material added at the locations J and M must be $(27/21.5)^2$ times greater than the weight of the material removed, from the locations N and Q. Thus, the total weight of the racket would be increased. The moment of inertia about the longitudinal axis a—a would be increased by this increased weight, 13a and 14a. This will allow the ball to be struck further off the longitudinal axis.

Figure 16:
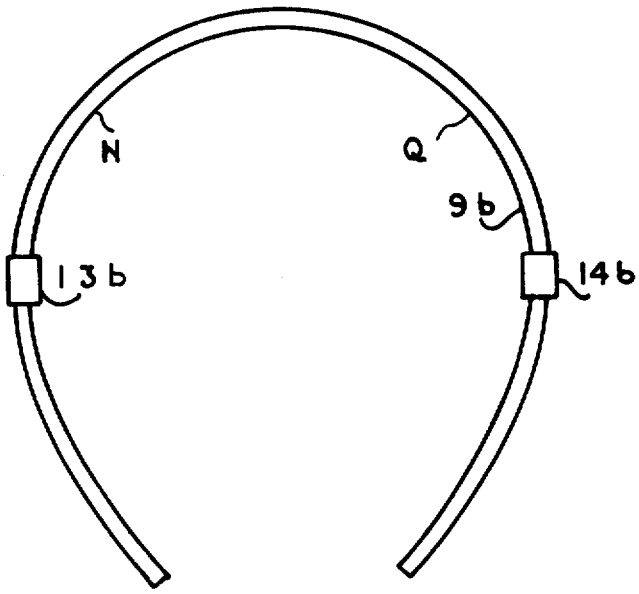
FIG. 16 is a front view of another alternate component member 9 of FIG. 4 and FIG. 8.

FIG. 16 shows another shape for the racket frame as 9b. The shape of the frame 9b removes more weight from the locations N and Q than does the frame 9a, and allows the weights 13b and 14b to be greater.

Figure 19:
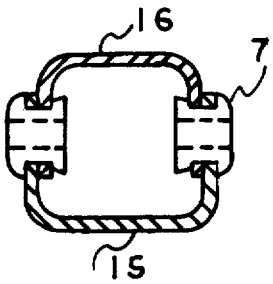
FIG. 19 is a crossection view of section 19—19 of head portion of FIG. 17.
Figure 18:
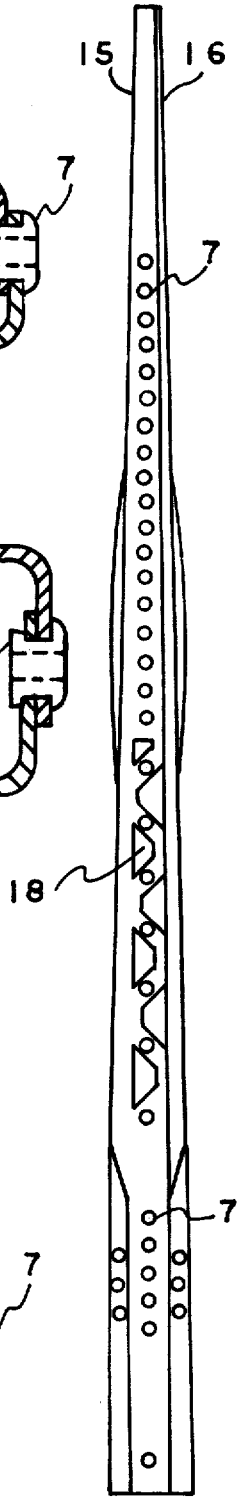
FIG. 18 is a side view of FIG. 17.

Shown in FIGS. 17 and 18 is a racket fabricated by the assembly of two metal formings of aluminum 15 and 16. In FIG. 19, the crossection 19—19 of FIG. 17 is shown. The racket is made of 7075-T6 aluminum, 0.020 inches thick. The formings are assembled by the application of epoxy glue to the mating surfaces. Holes utilizing pop rivets 7 are used as feed through holes for the strings and also to assist in fastening the two halves 15 and 16 together. The shape of the racket, weight, weight distribution and stiffness conform to the objectives given for the previous embodiments. In FIG. 17, material is formed at the locations U, V, and W, to improve the stiffness. It is known that crossections which have thin walled material have greter strength and rigidity per unit weight, than solid or thicker crossection. The material may have the wall thickness reduced to gain this advantage, until a point is reached wherein the material is too easily dented. Further, as the wall becomes thinner, the ability of the crossection to maintain its shape under stress is diminished. Thus, the material which is being stressed is not held in place, and the rigidity which might be expected from a calculation of the applicable formula is not realized. The crossection acts under stress as though a material with a reduced modulus of elasticity was being employed. In order to keep the material in place additional material and formed ribs and braces are used in locations such as U, V, and W, shown in FIG. 17.

Figure 20:
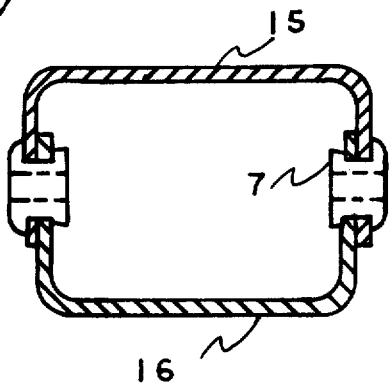
FIG. 20 is a crossection view of section 20—20 of the throat portion of the racket shown in FIG. 17.

FIG. 20 is a view of section 20—20 of FIG. 17.

Figure 21:
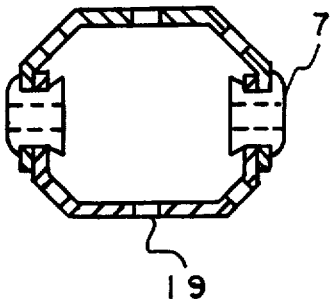
FIG. 21 is a crossection view of section 21—21 of the handle portion of the racket shown in FIG. 17.

FIG. 21 is a view of section 21—21 of FIG. 17.

In FIG. 18, openings 18 and 19 are provided to reduce the weight of the handle and the grip.

Figure 22:
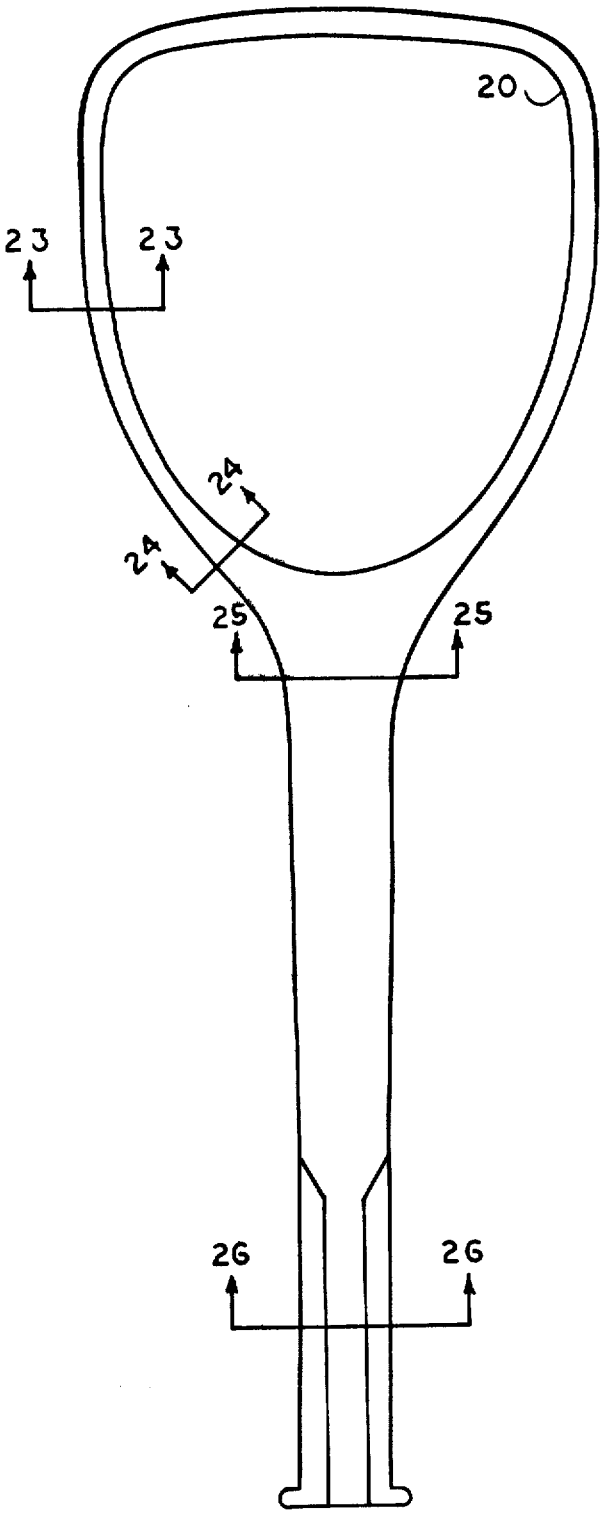
FIG. 22 is a front view of a racket which is another embodiment of the invention.
Figure 23:
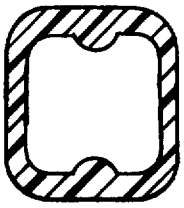
FIG. 23, FIG. 24, FIG. 25 and FIG. 26 are crossectional views of the sections 23—23, 24—24, 25—25 and 26—26 shown in FIG. 22.
Figure 24:
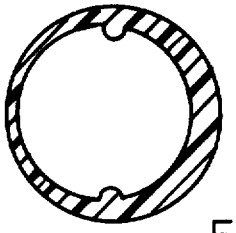
Figure 25:
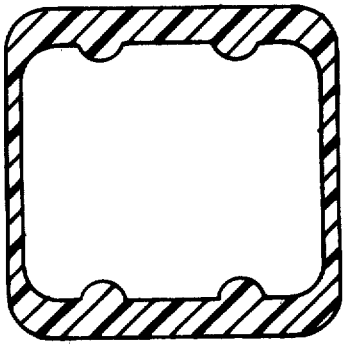
Figure 26:
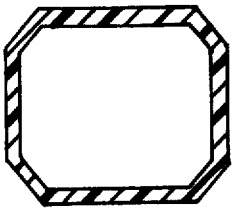

Another embodiment is shown in FIG. 22. A racket is fabricated of a composite material such as epoxy with fiberglass, epoxy with graphite fibers, or epoxy with boron fibers. The racket frame 20 molded over a core made of Woods metal which has previously molded to shape. The core is removed by heating to a relatively low temperature at which the Woods metal melts. The racket frame 20 is molded so as to provide ribs and thicker crossections as required by the stresses. Such crossections are shown in FIGS. 23, 24 and 25 for the crossections 23—23, 24—24 and 25—25 shown in FIG. 22. These ribs and thicker surfaces provided for additional stiffening with a minimum of weight. FIG. 26 shows the crossection 26—26 of FIG. 22. The weight distribution and the use of reinforcement material, the frame 20, is in accordance with the objectives given for the previous embodiments.

The use of epoxy with graphite fibers or epoxy with boron fibers as the fabrication material for the frame 20 should provide for approximately a twenty percent reduction in weight for the same stiffness and swing weight over a racket fabricated of aluminum. The use of epoxy with fiberglass material should weigh more than aluminum. The use of these composite materials provide that vibrations are damped out quickly.

Figure 29:
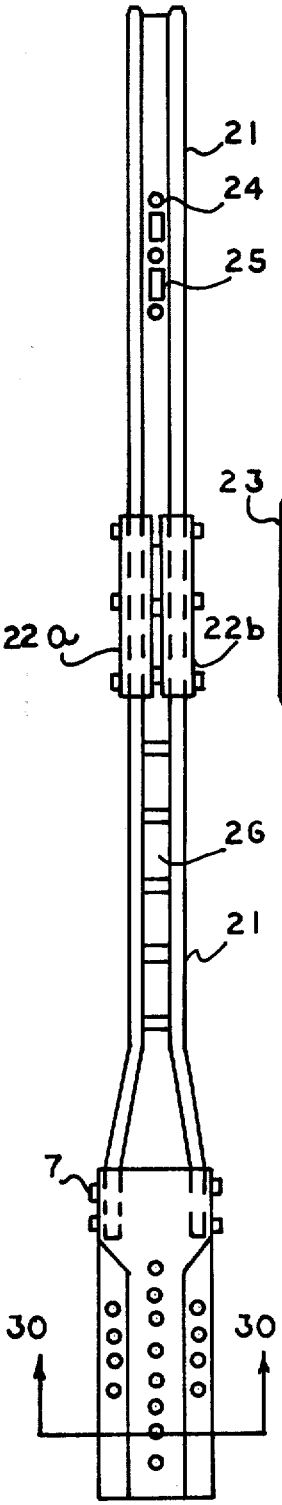
FIG. 29 is a side view of the embodiment shown in FIG. 27.
Figure 28:
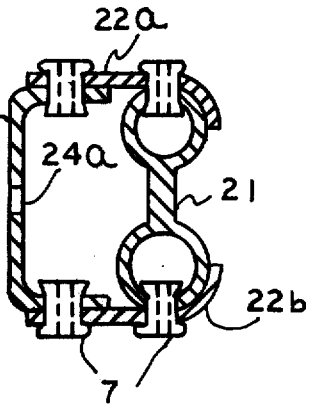
FIG. 28 is a crossectional view of the section 28—28 shown in FIG. 27.
Figure 30:
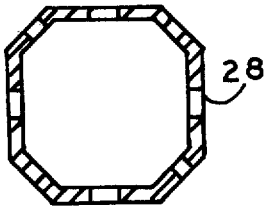
FIG. 30 is a crossectional view of the section 30—30 of the handle shown in FIG. 29.

Shown in FIG. 27 is another embodiment of the invention. The crossection 28—28 of FIG. 27 is shown in FIG. 28. The frame 21 is fastened to the plates 22a and 22b by the use of steel pop rivets 7. The mating surfaces are cleaned and glued with epoxy. These plates 22a and 22b are made of 7075-T6 aluminum, 0.020 inches thick and holes 28 are provided to reduce the weight with a minimum reduction in rigidity. Yoke 23 is also fastened to the frame 21 and the plates 22a and 22b by pop rivets 7 and epoxy glue. Holes 24a are provided for the racket strings. The frame 21 in FIG. 29 shows openings 24 to feed the racket strings through and openings 25 and 26 to reduce the weight. The section of the handle 30—30 of FIG. 29 is shown in FIG. 30. The handle 27 is mode of 7075-T6 aluminum, 0.020 inches thick and is perforated with holes 28. The handle 27 is fastened to the spread frame 21 by the use of steel pop rivets 7 and the use of epoxy glue on the mating surfaces. The weight distribution and the rigidity is in accordance with the objectives given for the previous embodiments.

Figure 33:
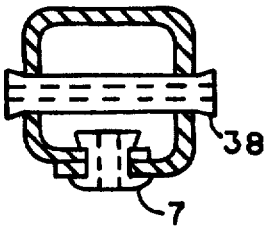
Figure 34:
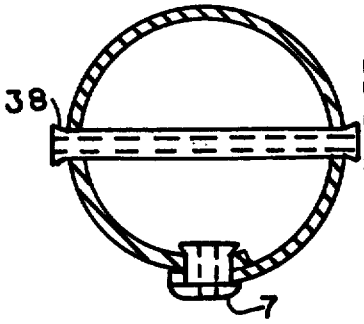
Figure 35:
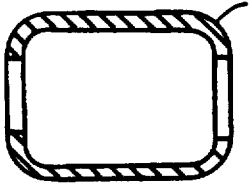
Figure 36:
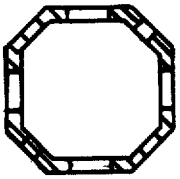

Shown in FIG. 31 is another embodiment of the invention. The frame members 29, 30a, 30b, 31a, 31b, 32a, 32b, 33a, 33b and 34 are made of 7075 T-6 aluminum, 0.020 thick. Crossections 33a—33a and 33b—33b of FIG. 31 are the same and are shown in FIG. 33. The metal is formed as shown and fastened together by the use of the pop rivet 7. A plastic tube 38 is used in the holes as a guide for the racket strings and prevents the metal edges from cutting the strings. Shown in FIG. 34 is the crossection 34—34 shown in FIG. 31. FIG. 35 shows the crossection 35—35 shown in FIG. 32. FIG. 36 shows the crossection of the handle grip 36—36 in FIG. 31. In FIG. 32 openings 35 are provided for the plastic tube 38, openings 36 are provided in the handle to reduce the weight yet maintain bending and torsional rigidity. Openings 37 are provided in the handle end to reduce the weight. The weight, weight distribution, and rigidity is in accordance with the objectives given for the previous embodiments.

Shown in FIG. 37 is an embodiment which allows the moment of inertia of the racket to be changed. In FIG. 37, 38 is the extruded frame. Cross member 39 in FIG. 37 is fastened to member 38 by rivets. Member 49 is a handle suitably fastened to member 38.

FIG. 38 is a view of the section 38—38 of FIG. 37. Shown in FIG. 38 the member 38 has tubular openings 40a and 40b and a central portion 41.

FIG. 39 is a view of the section 39—39 of a portion of member 38 as shown in FIG. 37.

Shown in FIG. 39 are lead pellets 42 located in the tubular openings 40a and 40b. These lead pellets may move in these tubular openings but are stopped by the pins 50 shown in FIG. 37. These lead pellets can be restrained in their movement by the spring 44 shown in FIG. 39. When the spring 44 is in the normal position shown, the lead pellets cannot move in the direction shown past the spring end. However, they can move in the opposite direction past the spring end, since the movement of the weight forces the spring to swing out of the way. To allow the pellets to move in the direction opposite to that indicated, the flexible nylon string 45 is pulled through the hole 46 so as to pull the ends of the spring 44 out of the way of the pellets. The spring 44 is shaped as shown in FIG. 39, and is fastened to the central portion 41 of frame member 38 by a rivet 47. The members 38, 45, 44 and the hole 46 constitutes a valve which allows the player to lock a group of lead pellets between the stops 50 and the ends of the spring 44. Valves are positioned at locations K, L, H and J shown in FIG. 37. Thus, the player can hold the racket vertical and allow the pellets to be locked between the locations H and J and the stops 50. As the player executes the swing, the string 45 may be pulled releasing the lead pellets under centrifugal force to lodge between locations K and L and the stops 50 and be locked there until released. The player may also shift the pellets without swinging the racket by raising or lowering the racket head vertically and operating the valves. The weight, weight distribution, and rigidity of the rest of the embodiment conforms to the objectives of this invention shown in the previous embodiments.

It is understood that minor changes may be made in the devices of the invention without departing from the spirit of the invention and the scope of the appended claims.

I claim:

1. A complete tennis racket comprising at least a frame having a head portion supporting a string netting in a plane, and a handle portion having a grip portion suitably adapted for the hand to grip; said netting having a length along the longitudinal axis of said frame greater than 9 inches and a width along an axis perpendicular to said longitudinal axis greater than 7.5 inches; said racket having a weight W in ounces; a center of percussion located at a distance Cp in inches from the end of the grip portion, when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket having a length L in inches from the end of the grip portion to the end of the head portion; said racket having a center of gravity located a distance $C_g$ in inches from the end of the grip portion; said racket having a first moment of inertia $I_s$ in ounce inches squared about said pivot and $I_s$ is directly proportional to the product of $C_p$, $C_g$, W given by the formula $I_s=(C_p)(C_g)(W)$; said racket characterized in that the magnitude of Cp divided by the magnitude of L given by the formula $C_p/L$ is greater than 0.71; and the magnitude of the weight W is less than 10.7 ounces.

2. A racket as in claim 1 wherein the said length L is greater than 25.5 inches.

3. A racket as in claim 2; and the said magnitude of the moment of inertia $I_s$ is greater than 2500 ounce inches squared and less than 3450 ounce inches squared.

4. A tennis racket as in claim 2; and said racket having a weight and stiffness distribution providing for the nodal pivot closest to the grip portion end to be located at a distance N in inches from the said end of the grip portion, when tested in accordance with test 15 of FIG. 40 herein before defined; said racket characterized in that the magnitude of said distance N divided by the magnitude of the said distance L; given by the formula [N] $N/L$ is greater than 0.28.

5. A racket as in claim 2, and said racket having a weight and stiffness distribution providing for a frequency of vibration greater than 140 cycles per second when tested in accordance with test 13 of FIG. 40 herein before defined.

6. A tennis racket as in claim 5 wherein the said frequency of vibration is greater than 150 cycles per second.

7. A tennis racket as in claim 2; and said racket having a weight and stiffness distribution providing for a frequency of vibration greater than 175 cycles per second when tested in accordance with test 16 of FIG. 40 herein before defined.

8. A tennis racket as in claim 2; and said racket having a weight and stiffness distribution providing a frequency of vibration greater than 34 cycles per second when tested in accordance with test 18 of FIG. 40 herein before defined.

9. A tennis racket as in claim 2; and said racket having a weight and stiffness distribution providing a frequency of vibration greater than 40 cycles per second when tested in accordance with test 20 of FIG. 40 herein before defined.

10. A tennis racket as in claim 2; and said racket having a weight and stiffness distribution providing a frequency of vibration greater than 90 cycles per second when tested in accordance with test 22 of FIG. 40 herein before defined.

11. A tennis racket as in claim 2; and said racket having a center of the said string netting, located at a distance $C_f$ in inches from the end of the grip portion; providing for the difference in the magnitude of the said distance $C_f$ and the said distance $C_p$ divided by the distance $C_p$ given by the formula $(C_f-C_p)/C_p$ to be less than 0.12.

12. A tennis racket as in claim 2; and said racket having a weight distribution providing a second moment of inertia $I_a$ in ounce inches squared about a longitudinal axis running from the center of the head portion end to the center of the grip portion end; said racket further characterized in that the magnitude of the moment of inertia $I_a$ divided by the magnitude of the said moment of inertia $I_s$ given by the formula $I_a/I_s$ is greater than 0.020.

13. A tennis racket as in claim 2; wherein the said frame is made of metal having a modulus of elasticity in tension E in pounds per square inch, and a density d in pounds per cubic inch, and the ratio of [e/d] *E/d* is less than $110\times10^6$.

14. A tennis racket as in claim 2; wherein the said frame utilizes a composite of fibers and resin, and further the magnitude of the said weight W is less than 10.0 ounces.

15. A tennis racket as in claim 2 wherein the magnitude of W is less than 10.0 ounces.

16. A tennis racket as in claim 1 comprising a [fame] *frame* member being an elongated strip of material shaped to form a head portion, a throat portion and a pair of spaced substantially parallel sides into a shaft portion; said head portion curved to inclose a space suitable for supporting a string netting, said strip adapted to support said string netting; and a tubular grip member of thin wall material shaped for the hand to grip fastened to the ends of the spaced sides of the shaft portion of said frame member; and throat members being two sheets of thin wall material, each sheet having a top edge portion a bottom edge portion connected with side edge portions; said sheets having the side edge portions fastened to the said strip of material at the throat portion of said frame member.

17. A tennis racket as in claim 16, wherein the elongated strip of said frame is curved to inclose a space substantially wider at the head portion end that at the throat portion.

18. A racket as in claim 1 and said racket having a weight and stiffness distribution providing for a frequency of vibration greater than 90 cycles per second when tested in accordance with test 13 of FIG. 40 herein before defined.

19. A racket as in claim 1 and said racket having a weight and stiffness distribution providing for a frequency of vibration f in cycles per second when tested in accordance with test 13 of FIG. 40 herein before defined, and said racket further characterized in that the product of the said length L squared and the said frequency f given by the expression $L^2f$ is greater than 65,000.

20. A racket as in claim 19 wherein the said length L is greater than 23 inches.

21. A tennis racket as in claim 1 comprising a unitary frame formed by a resin reinforced fiber material having a head portion, a throat portion, and a shaft portion; said head portion inclosing a space suitable to support a string netting in a plane, said head portion having two arms of hollow crossection approaching the throat portion, said two arms of said head portion merging into the throat portion; said throat portion having a hollow crossection having upper and lower throat walls substantially parallel to the plane of said string netting connected by two throat side walls, said throat portion merging with the shaft portion; said shaft portion having upper and lower shaft walls substantially parallel to the plane of said string netting connected by two shaft side walls, said shaft portion merging with the grip portion; said grip portion having a hollow cross section having a thin wall, said grip portion formed suitably for the hand to grip.

22. A tennis racket as in claim 1 having a hollow metal frame of two part shell construction comprising substantially outer and inner shells each having an open side and two opposing sides connected by a central wall, the outer shell receiving the inner shell in an inverted position therein, said opposing sides of the outer shell adjacent to the opposing sides of the inner shell; means for fastening said sides of the outer shell to the adjacent side of the inner shell; said frame having a head portion capable of supporting a string netting in a plane, a throat portion, a shaft portion and a grip portion.

23. A complete tennis racket comprising at least a frame having a head portion supporting a string netting in a plane, and a handle portion having a grip portion suitably adapted for the hand to grip, said netting having a length along the longitudinal axis of said frame greater than 9 inches and a width along an axis perpendicular to said axis greater than 7.5 inches; said racket having a weight W in ounces; a center of percussion located at a distance $C_p$ in inches from the end of the grip portion, when tested in accordance with test 4 of FIG. 40 herein before defined, said center of percussion taken about a pivot located at the end of the grip portion, said pivot having an axis perpendicular to the longitudinal axis of said racket and parallel to the plane of said string netting; said racket having a length L in inches from the end of the grip portion to the end of the head portion; said racket having a center of gravity located at a distance $C_g$ in inches from the end of the grip portion; said racket having a first moment of inertia $I_s$ in ounce inches squared about said pivot, and $I_s$ is directly proportional to the product of $C_p$, $C_g$, W, given by the formula $I=(C_p)(C_g)(W)$; said racket characterized in that the magnitude of $C_p$ is greater than 18.75 inches, and the weight W is less than 10.7 ounces.

24. A racket as in claim 23; and the said magnitude of $I_s$ is greater than 2500 ounce inches squared and less than 3500 ounce inches squared.

25. A tennis racket as in claim 23; and said racket having a weight and stiffness distribution providing for the nodal pivot closest to the grip portion end to be located at a distance N in inches from the end of the grip portion, when tested in accordance with test 15 of FIG. 40 herein before defined; said racket characterized in that the magnitude of the said distance N is greater than 7.5 inches.

26. A tennis racket as in claim 23; and said racket having a weight and stiffness distribution providing a frequency of vibration greater than 140 cycles per second when tested in accordance with test 13 of FIG. 40 herein before defined.

27. A tennis racket as in claim 26 wherein the said frequency of vibration is greater than 150 cycles per second.

28. A racket as in claim 26; and said racket having said distance $C_p$ greater than 19.3 inches.

29. A tennis racket as in claim 23; and said racket having a weight and stiffness distribution providing a frequency of vibration greater than 175 cycles per second when tested in accordance with test 16 of FIG. 40 herein before defined.

30. A tennis racket as in claim 23; and said racket having a weight and stiffness distribution providing a frequency of vibration greater than 34 cycles per second when tested in accordance with test 18 of FIG. 40 herein before defined.

31. A tennis racket as in claim 23; and said racket having a weight and stiffness distribution providing a frequency of vibration greater than 40 cycles per second when tested in accordance with test 20 of FIG. 40 herein before defined.

32. A tennis racket as in claim 23; and said racket having a weight stiffness distribution providing a frequency of vibration greater than 90 cycles per second when tested in accordance with test 22 of FIG. 40 herein before defined.

33. A tennis racket as in claim 23; and said racket having a center of said string netting located a distance $C_f$ in inches from the end of the grip portion; said racket further characterised in that the difference in the magnitude of the said distance $C_f$ and the said distance $C_p$ divided by the said distance $C_p$ given by the formula $C_f$-$C_p/C_p$ is less than 0.12.

34. A tennis racket as in claim 23; and said racket having a weight distribution providing a second moment of inertia $I_a$ in ounce inches squared about a longitudinal axis running from the center of the grip portion end to the center of the head portion end; said racket further characterized in that the magnitude of the moment of inertia $I_a$ divided by the magnitude of the said moment of inertia $I_s$ given by the formula $I_a/I_s$ is greater than 0.020.

35. A tennis racket as in claim 23; wherein the said frame is made of metal having a modulus of elasticity in tension E in pounds per square inch and a density d in pounds per cubic inch, and the ratio of E/d is less than $110\times10^6$.

36. A tennis racket as in claim 23; wherein the said frame utilizes a composite of fibers and resin; and further the magnitude of the weight W is less than 10.0 ounces.

37. A tennis racket as in claim 23; and said head portion being an elongated strip having a center portion and two adjacent end portions curved to inclose said string netting; said handle portion being a thin wall tube having located at a first end said grip portion suitably formed for the hand to grip, and said tube gradually formed along the length toward a second end portion into a crossectional shape having an upper wall and a lower wall located at a substantial distance from a plane bisecting said tube lengthwise and said plane being parallel to the plane of said string netting; said second end portion of said tube being fastened to said head portion.

38. A tennis racket as in claim 23 wherein the magnitude of W is less than 10.0 ounces.

39. A tennis racket as in claim 23 wherein the distance $C_p$ is greater than 19.5 inches.

40. A tennis racket as in claim 23, and having a displacement less than 0.008 inches for $D_1$ when tested as indicated in test 14 of FIG. 40 herein before defined.

41. A racket as in claim 23 and said racket having a weight and stiffness distribution providing for a frequency of vibration greater than 90 cycles per second when tested in accordance with test 13 of FIG. 40 herein before defined.

42. A complete tennis racket comprising at least a frame having a head portion supporting a string netting in a plane, and a grip portion suitably adapted for the hand to grip; said racket having a weight and stiffness distribution providing for the nodal pivot closest to the grip portion end being located at a distance N inches from the said end of the grip portion, when tested in accordance with test 15 of FIG. 40 herein before defined; said racket characterized in that the magnitude of the said distance N is greater than 7.5 inches.

43. A tennis racket as in claim 42; and said racket having a center of gravity located at a distance $C_g$ from the end of the grip portion; and said racket having a length L from the end of the grip portion to the end of the head portion; said racket further characterized in that the magnitude of the said distance $C_g$ divided by the magnitude of the said distance L given by the formula $C_g/L$ is greater than 0.56.

44. A tennis racket as in claim 42 wherein the said distance N is greater than 8.0 inches.

45. A complete tennis racket comprising at least a frame having a head portion supporting a string netting in a plane, and a grip portion suitably adapted for the hand to grip; said racket having a weight and stiffness distribution providing for the nodal pivot closest to the grip portion end being located at a distance N from the said end of the grip portion, when tested in accordance with test 15 of FIG. 40 herein before defined; said racket having a length L from the end of the grip portion to the end of the head portion; said racket characterized in that the magnitude of the said distance N divided by the said distance L given by the formula N/L is greater than 0.28.

46. A tennis racket as in claim 45; and said racket having a center of gravity located at a distance $C_g$ from the end of the grip portion; and said racket having a length L from the end at the grip portion to the end of the head portion; said racket further characterized in that the magnitude of the said distance $C_g$ divided by the magnitude of the said distance L given by the formula $C_g/L$ is greater than 0.56.

47. A tennis racket as in claim 45; and said racket having a center of percussion located a distance $C_p$ in inches from the end of the grip portion when tested in accordance with test 4 of FIG. 40 herein before defined; said center of percussion taken about a pivot located at the end of the grip portion, said pivot having an axis perpendicular to the longitudinal axis of said frame and parallel to a plane containing the surface of the frame; said racket having a center of gravity located at a distance $C_g$ in inches from the end of the grip portion; said racket further characterized in that the magnitude of the said distance $C_g$ divided by the magnitude of the said distance $C_p$ given by the formula $C_g/C_p$ is greater than 0.80.

48. A tennis racket as in claim 45 wherein the said ratio N/L is greater than 0.31.

49. A tennis racket as in claim 45; and said racket having a center of percussion located at a distance $C_p$ in inches from the end of the grip portion, when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket characterized in that the magnitude of $C_p$ divided by the magnitude of the said distance L, given by the formula $C_p/L$ is greater than 0.71.

50. A tennis racket as in claim 45; and said racket having a unitary frame member formed of a resin reinforced fiber material; and said racket having a center of percussion located at a distance $C_p$ in inches from the end of the grip portion, when tested in accordance with test 4 of FIG. 40 herein before defined, said center of percussion taken about a pivot located at the end of the grip portion, said pivot having an axis per perpendicular to the longitudinal axis of said frame and parallel to the plane of said string netting; said racket characterized in that the magnitude of $C_p$ divided by the magnitude of the said distace L given by the formula $C_p/L$ is greater than 0.71.

51. A complete tennis racket comprising at least a frame including a head portion supporting a string netting, and a grip portion suitably adapted for the hand to grip; said racket having a weight and stiffness distribution providing a frequency of vibration f in cycles per second when tested in accordance with test 13 of FIG. 40 herein before defined; and said racket having a length L in inches from the end of the grip portion to the end of the head portion; said racket characterized in that the magnitude of f is greater than 150 cycles per second, and the magnitude of L is greater than 25.5 inches.

52. A tennis racket as in claim 51; and said racket having a center of gravity located at a distance $C_g$ from the end of the grip portion; said racket further characterized in that the magnitude of the said distance $C_g$ divided by the magnitude of the said distance L given by the formula $C_g/L$ is greater than 0.56.

53. A tennis racket as in claim 51; and said racket having a center of percussion located at a distance $C_p$ in inches from the end of the grip portion, when tested in accordance with test b 4 of FIG. 40 herein before defined; said center of percussion taken about a pivot located at the end of the grip portion, said pivot having an axis perpendicular to the longitudinal axis of the racket and parallel to a plane containing the surface of the frame; said racket having a center of gravity located at a distance $C_g$ in inches from the end of the grip portion; said racket further characterized in that the magnitude of the said distance $C_g$ divided by the magnitude of the said distance $C_p$ given by the formula $C_g/C_p$ is greater than 0.80.

54. A tennis racket as in claim 51 wherein the said frequency of vibration is greater than 155 cycles per second.

55. A tennis racket as in claim 54; and said racket having a unitary frame member formed of a resin reinforced fiber material.

56. A tennis racket as in claim 51 wherein the said frame is made of a material having a modulus of elasticity in tension E in pounds per square inch and a density d in pounds per cubic inch, and the ratio of E/d is less than $110\times10^6$.

57. A tennis racket as in claim 51 comprising a frame member made of an elongated strip of material shaped to form a head portion, a throat portion and a pair of spaced substantially parallel sides into a shaft portion; said head portion curved to inclose a space suitable for supporting a string netting, said strip adapted to support said string netting; a tubular grip member of thin wall material shaped for the hand to grip fastened to the ends of the spaced sides of the shaft portion of said frame member; throat members being two sheets of thin wall material, each sheet having a top edge portion, a bottom edge portion connected with side edge portions; said sheets having the side edge portions fastened to the strip of material at the throat portion of said frame member.

58. A tennis racket as in claim 57 wherein the strip of material comprising said frame has a crossection having tubular edge portions joined by a central web portion; material suitable for moving freely within the tubular edge portions; means for entrapping at will said material suitable for moving freely, in sections of the tubular edge portions of said strip; and means for releasing at will said material entrapped, thereby changing the moment of inertia of said frame member about a first axis running from the center of the head portion to the center of the grip member end, and the moment of inertia about a second axis through the end of the grip member perpendicular to the said first axis and parallel to a plane containing the surface of said frame.

59. A tennis racket as in claim 51; and said racket having a center of percussion located at a distance $C_p$ in inches from the end of the grip portion, when tested in accordance with test 4 of FIG. 40 herein before defined, said center of percussion taken about a pivot located at the end of the grip portion, said pivot having an axis perpendicular to the longitudinal axis of said frame and parallel to the plane of the said string netting; said racket characterized in that the magnitude of $C_p$ divided by the magnitude of the said length L, given by the formula $C_p/L$ is greater than 0.71.

60. A tennis racket as in claim 51; and said racket having a weight and stiffness distribution providing for the nodal pivot closest to the grip portion end being located at a distance N from the said end of the grip portion, when tested in accordance with test 15 of FIG. 40 herein before defined; said racket characterized in that the magnitude of the said distance N divided by the said length L given by the formula N/L is greater than 0.28.

61. A tennis racket as in claim 51; and said racket having a unitary frame member formed of a resin reinforced fiber material; and said racket having a center of percussion located at a distance $C_p$ in inches from the end of the grip portion, when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket characterized in that the magnitude of $C_p$ divided by the said length L, given by the formula $C_p/L$ is greater than 0.71.

62. A complete tennis racket comprising at least a metal frame having a head portion supporting a string netting, and a grip portion suitably adapted for the hand to grip; said racket having a weight and stiffness distribution providing a frequency of vibration f in cycles per second when tested in accordance with test 16 of FIG. 40 herein before defined; and said racket having a length L in inches from the end of the grip portion to the end of the head portion; said racket characterized in that the magnitude of f is greater than 175 cycles per second, and the magnitude of L is greater than 25.5 inches.

63. A complete tennis racket comprising at least a frame having a head portion supporting a string netting, and a grip portion suitably adapted for the hand to grip; said racket with said frame supporting a string netting having a weight W in ounces, and a center of gravity located at a distance $C_g$ in inches from the end of the grip portion, said racket having a length L in inches from the end of the grip portion to the end of the head portion; said racket characterized in that the magnitude of the said distance $C_g$ divided by the said length L given by the formula $C_g/L$ is greater than 0.56; and said racket has a weight W less than 10.7 ounces; and the ratio of W/L is less than 0.4.

64. A complete tennis racket comprising at least a frame having a head portion supporting a string netting and a grip portion suitably adapted for hand to grip; said racket having a weight distribution providing a first moment of inertia $I_s$ in ounce inches squared about a pivot located at the end of the grip portion, said pivot having an axis perpendicular to the longitudinal axis of said racket running from the center of the head portion end to the center of the grip portion end, and parallel to the plane of said string netting, and a second moment of inertia $I_a$ in ounce inches squared about said longitudinal axis; and said racket having a center of gravity located at a distance $C_g$ from the end of the grip portion; and said racket having a length L from the end of the grip portion to the end of the head portion; said racket characterized in that the magnitude of the said distance $C_g$ divided by the magnitude of the said distance L given by the formula $C_g/L$ is greater than 0.56; and the magnitude of the moment of inertia $I_a$ divided by the magnitude of the said moment of inertia $I_s$ given by the formula $I_a/I_s$ is greater than [0.20.] *0.020.*

65. A complete tennis racket comprising at least a frame having a head portion supporting a string netting, and a grip portion suitably adapted for the hand to grip; said racket having a weight W in ounces, a center of percussion located a distance $C_p$ in inches from the end of the grip portion, when tested in accordance with test 4 of FIG. 40 herein before defined, said center of percussion taken about a pivot located at the end of the grip portion, said pivot having an axis perpendicular to the longitudinal axis of said frame and parallel to a plane containing the surface of the frame; said racket having a length L in inches from the end of the grip portion to the end of the head portion; said racket having a center of gravity located at a distance $C_g$ in inches from the end of the grip portion; said racket characterized in that the magnitude of the said distance $C_g$ divided by the magnitude of the said distance $C_g$ given by the formula $C_g/C_p$ is greater than 0.80 and the magnitude of the weight W is less than 10.7 ounces.

66. A racket as in claim 65 and said racket having a weight and stiffness distribution providing a frequency of vibration f in cycles per second when tested in accordance with test 13 of FIG. 40 herein before defined, and said racket having a length L in inches from the end of the grip portion to the end of the head portion; said racket further characterized in that the product of the said length squared and the said frequency of vibration f given by the expression $L^2f$ is greater than 65,000.

67. A tennis racket having great rigidity and strength with a minimum of weight comprising a head member and a handle member; said head member being an elongated hollow tubular metal strip having a center portion and two adjacent end portions shaped to partially inclose a space, said head member adapted to support a string netting in a plane; said handle member being a thin wall aluminum alloy tube having a yield strength greater than 55,000 pounds per square inch, said wall having a thickness less than 0.025 inches and said tube having a grip portion, and a shaft portion, said grip portion suitably formed for the hand to grip and said shaft portion gradually formed along the length toward the head member into a crossectional shape having an upper wall and a lower wall and two side walls, said walls being substantially planar and said side walls being substantially perpendicular to said upper and lower walls; said end portions of the head member having a crossectional shape to provide an upper surface and a lower surface located at a distance from a plane bisecting the head member lengthwise and said plane being parallel to the plane of said string netting; and said upper and lower walls of said shaft portion being located at substantially the same distance from said plane, and said upper and lower walls of the shaft portion being fastened to the said upper and lower surfaces of the end portions of said head member; and wherein the portion of said handle member having an axial length of 14 inches from the handle end of the racket, has a weight less than 3.0 ounces, and the weight of the racket extending beyond the said length of 14 inches is greater than 6.0 ounces.

68. A tennis racket as in claim 67 wherein said side walls are selectively perforated to provide apertures in portions there of to reduce the weight with a minimum reduction in strength and rigidity.

69. A tennis racket as in claim 67; and a string netting supported by said head member; a planar strip of material having a first surface lying in a plane, placed at a location on a surface of said string netting, said strip having sufficient length and breadth to extend over the spaces between multiple strings and said surface of said strip having adhesive means to fasten to said strings, and said location on said string netting positioned to reduce the probability of impact of said strip with a ball during play; and said strip comprised of material capable of damping the vibratory motion of said strings subsequent to the impact of a ball upon said strings; said strip having a second surface parallel to said first surface and said second surface being substantially durable, non abrasive, and non-adhesive.

70. A tennis racket as in claim 67; and a removable thin sleeve tightly secured without pleats over said grip portion of said handle member, said sleeve being made of thin cloth, said cloth having all fibers woven and lying substantially in a surface, said cloth having an upper side and a lower side, and said cloth having at least one side free of adhesive material, and said cloth being durable, washable, and light in weight; and said sleeve being capable of allowing water to pass through said sleeve quickly.

71. A tennis racket comprising a head member and a handle member; said head member being an elongated metal strip having a center portion and two adjacent end portions shaped to partially inclose a space, said head member adapted to support a string netting in a plane; said handle member being a thin wall tube having located at a first end a grip portion, said grip portion suitably formed for the hand to grip and said tube generally formed along the length toward the second end portion into a crossectional shape having an upper wall and a lower wall located at a substantial distance from a plane bisecting said handle member lengthwise and said plane being parallel to the plane of said string netting, said second end portion being fastened to the said end portions of the said head member; said head member having the center portion substantially straight and lying perpendicular to a first axis, said axis running longitudinally from the center of the head end of the racket to the center of the handle end, and the said two adjacent end portions each substantially straight and forming corners with the center portion, and having the said end portions directed to converge toward a location in the second end portion of said handle member; a second axis perpendicular to the said first axis, said second axis being at a distance of 3.0 inches from the head end of the racket, said second axis intersecting said head member at locations, said locations being at the surface of said head member laterally outermost from said first axis, and the distance between said locations being greater than 9.0 inches; a third axis starting at one of the said locations on said head member, and running toward a point on the said first axis, said point being at a distance of 19 inches from the head end of the racket; a first plane being perpendicular to the said first axis and containing the said second axis, and a second plane being perpendicular to the said first axis and being located at a distance of 16.5 inches from the head end of the racket, and the portion of the racket lying between said first and second planes having a surface laterally outermost from said third axis, said surface being laterally on the same side of the first axis as the third axis, and said surface being at a maximum distance from said third axis less than 0.75 inches.

72. A tennis racket as in claim 71 wherein said head member has a greater weight per inch of length at the locations of said corners than at other locations on said head member.

73. A tennis racket having great rigidity and light weight comprising a head member, a throat member, and a handle member; said head member being an elongated hollow tubular metal strip having a center portion and two adjacent end portions shaped to partially inclose a space, said head member adapted to support a string netting in a plane; said handle member being a thin wall aluminum alloy tube having a yield strength greater than 55,000 pounds per square inch and said wall having a thickness less than 0.025 inches and said tube having a grip portion and a shaft portion, said grip portion suitably formed for the hand to grip and said shaft portion gradually formed along the length toward the head member into a crossectional shape having an upper wall and a lower wall and two side walls, said upper and lower walls lying parallel to the plane of said string netting and said sidewalls lying perpendicular to said plane and said walls being substantially planar; said end portions of said head member having a crossectional shape having an upper surface and a lower surface located at a distance from a plane bisecting said head member lengthwise and said plane being parallel to the plane of said string netting; and said upper and lower walls of said shaft portion being located at substantially the same distance from said plane bisecting said head member lengthwise; and said throat member comprising a separate first planar sheet of thin wall metal having a portion fastened to the exterior of said upper wall of the shaft portion of said handle member and another portion of said first sheet fastened to the said upper surface of said head member, and a second separate planar sheet of thin wall metal having a portion fastened to the exterior of the said lower wall of the shaft portion of the handle member, and another portion of said second sheet fastened to the lower surface of said head member; and wherein the portion of said handle member having an axial length of [14] *8* inches from the handle end of the racket has a weight less than 3.0 ounces, and the weight of the racket extending beyond the said length of [14] *8* inches is greater than 6.0 ounces.

74. A tennis racket as in claim 73, and a string netting supported by said head member, and wherein the said first and second sheets of thin wall metal of the throat member having portions of said sheets adjacent to said string netting suitably adapted to support said string netting; and said string netting supported by said throat member.

75. A tennis racket having rigidity and light weight comprising a head member, a throat member, and a handle member; said head member being an elongated hollow tubular metal strip having a center portion and two adjacent end portions shaped to partially inclose a space, said head member adapted to support a string netting in a plane; said handle member being a thin wall aluminum alloy tube having a yield strength greater than 55,000 pounds per square inch and said wall having a thickness less than 0.025 inches and said tube having a grip portion suitably formed for the hand to grip and a shaft portion gradually formed along the length toward the head member into a crossectional shape having a planar upper wall and a planar lower wall and two planar side walls, said upper and lower walls lying parallel to the plane of said string netting and said side walls lying perpendicular to said upper and lower walls; said end portions of said head member having a crossectional shape having an upper surface and a lower surface located at a distance from a plane bisecting said head member lengthwise and said plane being parallel to the plane of said string netting; and said upper and lower walls of said shaft portion being located at substantially the same distance from said plane bisecting said head member lengthwise; and said throat member comprising a sheet of thin wall material formed into a substantially u-shaped crossection having a first planar side opposing a second planar side and a third substantially planar side therebetween, said third side being straight in a direction perpendicular to a plane passing through the longitudinal axis of said racket, said plane being perpendicular to the plane of said string netting; said first and second sides being fastened to the said upper and lower surfaces of the said end portions of said head member and said first and second sides lying exterior to and being fastened to the said upper wall and lower wall of said shaft portion of said handle member, and the third side of said throat member adapted to support said string netting.

76. A tennis racket frame having strength and rigidity with a minimum weight; said frame having a head portion, supporting a string netting in a plane, a throat portion, and a handle portion; a throat member comprising a sheet of thin wall material formed into a substantially u-shaped crossection having a first planar side opposing a second planar side and a third substantially planar side between said first and second sides, and said first and second sides each lying in single planes, and said third side being straight in a direction perpendicular to a plane passing through the longitudinal axis of said racket frame, said plane being perpendicular to the plane of said string netting; said first and second sides being fastened to the outer surfaces of the throat portion of said frame.

77. A tennis racket as in claim 76 wherein the said first and second sides are selectively perforated to provide multiple apertures, in portions thereof to reduce the weight, the number of said apertures occurring in an inch of length of said sides being greater than 3.

78. A tennis racket having ridigity and strength with a minimum of weight, said tennis racket comprising at least a head member supporting a string netting in a plane, a throat member, and a handle member; said handle member comprising a thin wall material formed into a tube having a first end grip portion suitably formed for the hand to grip, and said tube gradually formed along the length toward the second end portion into a crossectional shape having a substantially planar upper wall and a substantially planar lower wall and two substantially planar side walls, said upper and lower walls being located at a substantial distance from a plane bisecting said handle lengthwise, and said plane being parallel to the plane of said string netting, and said side walls being substantially perpendicular to said upper and lower walls; and said second end portion being fastened to the other members of said racket; and wherein a portion of said racket having an axial length of [14] *8* inches from the handle end has a weight less than 3.0 ounces, and the said grip portion of the handle has a circumference greater than 4.25 inches and less than 5.25 inches, and the weight of the portion of the racket extending beyond the said distance of [14] *8* inches from the handle end is greater than 6.0 ounces.

79. A racket as in claim 78 wherein said side walls being selectively perforated to provide apertures in portions thereof to reduce the weight with a minimum reduction in strength and rigidity.

80. A racket as in claim 78 wherein the material of said handle member is an aluminum alloy having a yield strength greater than 55,000 pounds per square inch and having a wall thickness less than 0.025 inches.

81. A tennis racket comprising at least a head portion, a throat portion, and a grip portion; said head portion being an elongated strip of material shaped to partially inclose a space for a string netting, said head portion adapted to support said string netting; said head portion comprising a center portion and two adjacent side portions, said center portion being substantially straight and placed perpendicular to a first axis running longitudinally from the center of the head portion to the center of the grip portion end, and the two adjacent side portions being substantially straight and forming corners with the center portion and said side portions directed to converge toward the throat portion of said racket; a second axis perpendicular to the said first axis, said second axis being at a distance of 3.0 inches from the head end of the racket, said second axis intersecting said head portion at locations, said locations being at the surface of said head portion laterally outermost from said first axis and the distance between said locations being greater than 9.0 inches, a third axis starting at one of the said locations on said head portion, and running toward a point on the said first axis said point being at a distance of 19 inches from the head end of the racket; a first plane being perpendicular to said first axis and containing said second axis, and a second plane being perpendicular to the said first axis and being located at a distance of 16.5 inches from the head end of the racket, and the portion of the racket lying between said first and second planes having a surface laterally outermost from said third axis, said surface being laterally on the same side of the first axis as the third axis and said surface being at a minimum distance from said third axis less than 0.75 inches; and said material of said head portion having a modulus of elasticity in tension greater than $2.5\times10^6$ pounds per square inch and said material having a yield strength in tension greater than $15\times10^3$ pounds per square inch.

82. A tennis racket as in claim 81, wherein said head portion has a greater weight per inch of length at the positions of said corners than at other positions on said head portion.

*83. A complete racket comprising at least a frame having a head portion supporting a string netting in a plane and a handle portion having a grip portion suitably adapted for the hand to grip; said racket having a weight and stiffness distribution providing a frequency of vibration f in cycles per second when tested in accordance with test 13 of FIG. 40 herein before defined; said racket having a weight and stiffness distribution providing for the nodal pivot closest to the grip portion end to be located at a distance N in inches from the end of said grip portion when tested in accordance with test 15 of FIG. 40 herein before defined; said racket characterized in that the magnitude of said frequency f is greater than 135 cycles per second; and the magnitude of said distance N is greater than 6.75 inches.*

*84. A complete racket comprising at least a frame having a head portion supporting a string netting in a plane and a handle portion having a grip portion suitably adapted for the hand to grip; said racket having a stiffness and weight distribution providing for the nodal pivot closest to the grip portion end to be located at a distance N in inches from the end of said grip portion when tested in accordance with test 15 of FIG. 40 herein before defined; said racket having a center of percussion located at a distance Cp in inches from the end of the grip portion when tested in accordance with test 4 in FIG. 40 herein defined, said center of percussion being taken about a pivot located at the end of the grip portion, said pivot having an axis perpendicular to the longitudinal axis of said frame and parallel to the plane of said string netting; said racket characterized in that the magnitude of said distance N is greater than 7.0 inches; and the magnitude of said distance Cp is greater than 18.75 inches.*

*85. A complete racket comprising at least a frame having a head portion supporting a string netting in a plane and a handle portion having a grip portion suitably adapted for the hand to grip; said racket having a stiffness and weight distribution providing for the nodal pivot closest to the grip portion end to be located at a distance N inches from the end of the grip portion when tested in accordance with test 15 of FIG. 40 herein before defined; said racket having a weight W in ounces; a center of percussion located at a distance Cp in inches from the end of the grip portion, when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket having a center of gravity located at a distance Cg in inches from the end of the grip portion; said racket having a first moment of inertia $I_s$ in ounce inches squared about said pivot and $I_s$ is directly proportional to the product of Cp, Cg, W, given by the formula $I_s=(C_p)(Cg)(W)$; a second moment of inertia $I_a$ in ounce inches squared about a longitudinal axis running from the center of the head portion end to the center of the grip portion end; said racket characterized in that the magnitude of the moment of inertia $I_a$ divided by the magnitude of the moment of inertia $I_s$ given by the formula $I_a/I_s$ is greater than 0.021 and the magnitude of the said distance N is greater than 6.75 inches.*

*86. A complete racket comprising at least a frame having a head portion supporting a string netting in a plane and a* handle portion having a grip portion suitably adapted for the hand to grip; said racket having a stiffness and weight distribution providing for the nodal pivot closest to the grip portion end to be located at a distance N in inches from the end of said grip portion, when tested in accordance with test 15 of FIG. 40 herein before defined; said racket having a displacement $D_1$ in inches when tested in accordance with test 14 of FIG. 40 herein before defined, said racket having a length L in inches from end of the grip portion to the end of the head portion; said racket characterized in that the magnitude of said distance N is greater than 6.75 inches; the magnitude of said displacement $D_1$ is less than 0.008 inches; and the magnitude of said length L is greater than 25.5 inches.

87. A complete racket comprising at least of frame having a head portion supporting a string netting in a plane, and a grip portion suitably adapted for the hand to grip; said racket having a weight and stiffness distribution providing for the nodal pivot closest to the grip portion end being located at a distance N in inches from the end of the grip portion, when tested in accordance with test 15 of FIG. 40 herein before defined; said racket having a center of gravity located at a distance Cg in inches from the end of said grip portion; said racket characterized in that the magnitude of said distance N is greater than 7.0 inches; and the magnitude of said distance Cg is greater than 14.5 inches.

88. A complete racket comprising at least a frame having a head portion supporting a string netting in a plane and a handle portion having a grip portion suitably adapted for the hand to grip; said racket having a stiffness and weight distribution providing for the nodal pivot closest to the grip portion end to be located at a distance N in inches from the end of the grip portion when tested in accordance with test 15 of FIG. 40 herein before defined; said racket having a length L in inches from the end of the grip portion to the end of the head portion; said racket having a center of gravity located at a distance Cg in inches from the end of the grip portion; said racket having a center of percussion located at a distance Cp in inches from the end of the grip portion when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket characterized in that the magnitude of said distance N divided by the magnitude of said distance L given by the formula N/L is greater than 0.26; and the magnitude of said distance Cg divided by the magnitude of said distance Cp given by the formula Cg/Cp is greater than 0.76.

89. A complete racket comprising of least a head portion, a throat portion, and a grip portion; said head portion being an elongated strip of material shaped to partially inclose a space for a string netting; a string netting supported by said head portion; said head portion comprising a center portion and two adjacent side portions, said center portion placed perpendicular to a first axis running longitudinally from the center of the head portion end to the center of the grip portion end, and the two adjacent side portions forming curved corners with the center portion, and said side portions directed to converge toward the throat portion of said racket; a second axis perpendicular to said first axis, said second axis being at a distance of 1.5 inches from the head end of the racket, said second axis intersecting said head portion at locations, said locations being at the surface of said head portion laterally outermost from said first axis and the distance between said locations being greater than 6.75 inches; said racket having a weight and stiffness distribution providing for the nodal pivot closest to the grip portion end to be located at a distance N in inches from the end of said grip portion when tested in accordance with test 15 in FIG. 40 herein before defined; said racket having a length L in inches from the end of the grip portion to the end of the head portion; said racket further characterized in that the magnitude of said distance N divided by the magnitude of said distance L given by the formula N/L, is greater than 0.25.

90. A complete racket comprising at least a head portion, a throat portion, and a grip portion; said head portion being an elongated strip of material shaped to partially inclose a space for a string netting, a string netting supported by said head portion; said head portion comprising a center portion and two adjacent side portions, said center portion placed perpendicular to a first axis running longitudinally from the center of the head portion end to the center of the grip portion end, and the two adjacent side portions forming curved corners with the center portion, and said side portions directed to converge toward the throat portion of said racket; a second axis perpendicular to the said first axis, said second axis being at a distance of 1.5 inches from the head end of the racket, said second axis intersecting said head portion at locations, said locations being at the surface of said head portion laterally outermost from said first axis and the distance between said locations being greater than 7.5 inches; said racket having a weight and stiffness distribution providing for a frequence of vibration f in cycles per second when tested in accordance with test 14 of FIG. 40 herein before defined; said racket further characterized in that the said frequency f is greater than 135 cycles per second.

91. A complete racket comprising at least a frame including a head portion supporting a string netting, and a grip portion suitably adapted for the hand to grip; said racket having a weight and stiffness distribution providing a frequency of vibration f in cycles per second when tested in accordance with test 13 of FIG. 40 herein before defined; said racket having a length L in inches from the end of the grip portion to the end of the head portion; said racket having a displacement $D_1$ in inches when tested in accordance with test 14 of FIG. 40 herein before defined; said racket characterized in that the magnitude of said frequency f is greater than 140 cycles per second; the magnitude of said displacement $D_1$ is less than 0.008 inches; and the said length L is greater than 25.5 inches.

92. A complete racket comprising at least a frame having a head portion supporting a string netting in a plane and a handle portion having a grip portion suitably adapted for the hand to grip; said racket having a weight and stiffness distribution providing for a frequency of vibration f in cycles per second when tested in accordance with test 13 of FIG. 40 herein before defined; said racket having a center of gravity located at a distance Cg in inches from the end of the grip portion, said racket having a center of percussion Cp in inches from the end of the grip portion when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket characterized in that the magnitude of said frequency f is greater than 140 cycles per second; the ratio of said distance Cg to the said distance Cp given by the formula Cg/Cp is greater than 0.75; and the said distance L is greater than 25.5 inches.

93. A complete racket comprising at least a frame having a head portion supporting a string netting in a plane and a

*handle portion having a grip portion suitably adapted for the hand to grip; said racket having a weight and stiffness distribution providing a frequency of vibration f in cycles per second when tested in accordance with test 13 of FIG. 40 hereinbefore defined; said racket having a center of percussion located at a distance Cp in inches from the end of the grip portion when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket characterized in that the magnitude of said frequency f is greater than 140 cycles per second; and the magnitude of said distance Cp is greater than 18.75 inches.*

*94. A complete racket comprising at least a frame having a head portion supporting a string netting in a plane and a handle portion having a grip portion suitably adapted for the hand to grip; said racket having a weight and stiffness distribution providing a frequency of vibration f in cycles per second when tested in accordance with test 13 of FIG. 40 herein before defined; said racket having a center of gravity located at a distance Cg in inches from the end of the grip portion; said racket characterized in that the magnitude of said frequency f is greater than 140 cycles per second; and said distance Cg is greater than 14.5 inches.*

*95. A complete racket comprising at least a frame having a head portion supporting a string netting in a plane and a handle portion having a grip portion suitably adapted for the hand to grip; said racket having a stiffness and weight distribution providing for a frequency of vibration f in cycles per second when tested in accordance with test 13 of FIG. 40 herein before defined; said racket having a weight W in ounces; a center of percussion located at a distance Cp in inches from the end of the grip portion when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket having a center of gravity located at a distance Cg in inches from the end of the grip portion; said racket having a first moment of inertia $I_s$ in ounce inches squared about said pivot; and $I_s$ is directly porportional to the product of Cp, Cg, W, given by the formula $I_s=(Cp)(Cg)(W)$; a second moment of inertia $I_a$ in ounce inches squared about a longitudinal axis running from the center of the head portion end to the center of the grip portion end; said racket having a length L in inches from the end of the grip portion to the end of the head portion; said racket characterized in that the magnitude of said frequency f is greater than 140 cycles per second; the magnitude of the said moment of inertia $I_a$ divided by the said moment of inertia $I_s$ given by the formula $I_a/I_s$ is greater than 0.021; and the magnitude of said length L is greater than 25.5 inches.*

*96. A complete racket comprising at least a head portion, a throat portion and a grip portion; said head portion being an elongated strip of material shaped to partially inclose a space for a string netting; a string netting supported by said head portion; said head portion comprising a center portion and two adjacent side portions, said center portion positioned perpendicular to a first axis running longitudinally from the center of the head portion end to the center of the grip portion end, and the two adjacent side portions forming curved corners with the center portion, and said side portions directed to converge toward the throat portion of said racket; a second axis perpendicular to the said first axis; said second axis being at a distance of 1.5 inches from the head end of the racket, said second axis intersecting said head portion at locations, said locations being at the surface of said head portion laterally outermost from said first axis, and the distance between said locations being greater than 7.5 inches, said racket having a weight W in ounces, said racket having a center of percussion Cp in inches from the end of the grip portion when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket having a center of gravity located at a distance Cg in inches from the end of the grip portion; said racket having a first moment of inertia $I_s$ in ounce inches squared about said pivot, and $I_s$ is directly proportional to the product of Cp, Cg, W, given by the formula $I_s=(Cp)(Cg)(W)$ a second moment of inertia $I_a$ in ounce inches squared about a longitudinal axis running from the center of the head portion end to the center of the grip portion end; said racket characterized in that the magnitude of the said moment of inertia $I_a$ divided by the magnitude of said moment of inertia $I_s$ given by the formula $I_a/I_s$ is greater than 0.021.*

*97. A racket as in claim 84, and said racket having a weight and stiffness distribution providing for a frequency of vibration greater than 135 cycles per second when tested in accordance with test 13 of FIG. 40 herein before defined.*

*98. A racket as in claim 88; and said racket having a weight and stiffness distribution providing for a frequency of vibration greater than 135 cycles per second when tested in accordance with test 13 of FIG. 40 herein before defined.*

*99. A racket as in claim 89; and said racket having a weight and stiffness distribution providing for a frequency of vibration greater than 135 cycles per second when tested in accordance with test 13 of FIG. 40 herein before defined.*

*100. A racket as in claim 85; and said racket having a weight and stiffness distribution providing a frequency of vibration greater than 135 cycles per second when tested in accordance with test 13 of FIG. 40 herein before defined.*

*101. A racket as in claim 83; and said racket having a center of gravity located at a distance Cg from the end of the grip portion, said distance Cg being greater than 14.5 inches.*

*102. A racket as in claim 93; and said racket having a weight less 12 ounces.*

*103. A racket as in claim 95; and said racket having a center of percussion located at a distance Cp in inches from the end of the said grip portion, when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket further characterized in that the magnitude of said distance Cp is greater than 18.75 inches.*

*104. A racket as in claim 90; and said racket having a center of percussion located at a distance Cp in inches from the end of the said grip portion, when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket further characterized in that the magnitude of said distance Cp is greater than 18.75 inches.*

*105. A racket as in claim 95; and said racket having a center of percussion located at a distance Cp in inches from the end of said grip portion, when tested in accordance with test 4 of FIG. 40 herein before defined, said center of percussion taken about a pivot located at the end of the grip portion, said pivot having an axis perpendicular to the longitudinal axis of said frame and parallel to the plane of said string netting; said racket having a center of gravity located at a distance Cg in inches from the end of the grip portion; said racket further characterized in that the magnitude of Cg divided by the magnitude of the said distance Cp given by the formula Cg/Cp is greater than 0.75.*

*106. A racket as in claim 96; and said racket having a weight and stiffness distribution providing a frequency of vibration greater than 135 cycles per second, when tested in accordance with test 13 of FIG. 40 herein before defined.*

*107. A racket as in claim 89; and said racket having a center of percussion located at a distance Cp in inches from the end of said grip portion, when tested in accordance with test 4 of FIG. 40 herein before defined, said center of percussion taken about a pivot at the end of the grip portion, said pivot having an axis perpendicular to the longitudinal axis of said frame and parallel to the plane of said string netting; said racket further characterized in that the magnitude of said distance Cp is greater than 18.75 inches.*

*108. A racket as in claim 85; and said racket having a center of percussion located at a distance Cp in inches from the end of the grip portion, when tested in accordance with test 4 of FIG. 40 herein before defined, said center of percussion taken about a pivot at the end of the grip portion, said pivot having an axis perpendicular to the longitudinal axis of said frame and parallel to the plane of the string netting; said racket further characterized in that the magnitude of said distance Cp is greater than 18.75 inches.*

*109. A racket as in claim 84 and said racket having a weight less than 12 ounces.*

*110. A racket as in claim 86 and said racket having a center of percussion located at a distance Cp in inches from the end of the grip portion, when tested in accordance with test 4 of FIG. 40 herein before defined, said center of percussion taken about a pivot at the end of the grip portion, said pivot having an axis perpendicular to the longitudinal axis of said frame and parallel to the plane of the string netting; said racket further characterized in the magnitude of said distance Cp is greater than 18.75 inches.*

*111. A racket as in claim 86; and said racket having a center of percussion located at a distance Cp in inches from the end of the grip portion, when tested in accordance with test 4 of FIG. 40 herein before defined, said center of percussion taken about a pivot at the end of the grip portion, said pivot having an axis perpendicular to the longitudinal axis of said frame and parallel to the plane of the string netting; said racket having a center of gravity located at a distance Cg in inches from the end of the grip portion; said racket further characterized in that the magnitude of said distance Cg divided by the said distance Cp given by the formula Cg/Cp is greater than 0.75.*

*112. A racket as in claim 89 and said racket having a displacement $D_1$ when tested in accordance with test 14 of FIG. 40 herein before defined, said displacement $D_1$ having a magnitude less than 0.008 inches.*

*113. A racket as in claim 85 and said racket having a displacement $D_1$ when tested in accordance with test 14 of FIG. 40 herein before defined, said displacement $D_1$ having a magnitude less than 0.008 inches.*

*114. A racket as in claim 86 said racket having a center of gravity located at a distance greater than 14.5 inches from the end of said grip portion.*

*115. A racket as in claim 85 and said racket having a center of gravity located at a distance greater than 14.5 inches from the end of said grip portion.*

*116. A complete racket comprising at least a frame having a head portion supporting a string netting and a handle portion having a grip portion suitably adapted for the hand to grip; said racket having a stiffness and weight distribution providing for a nodal pivot closest to the grip portion end to be located at a distance N inches from the end of the grip portion when tested in accordance with test 15 of FIG. 40 herein before defined; said racket having a length L in inches from the end of the grip portion to the end of the head portion; said racket having a center of gravity located at a distance Cg in inches from the end of the grip portion; said racket characterized in that the magnitude of said distance N divided by the magnitude of said distance L given by the formula N/L, is greater than 0.26; and the magnitude of said distance Cg divided by the magnitude of said distance L given by the formula Cg/L is greater than 0.54.*

* * * * *